(12) United States Patent
Shima

(10) Patent No.: US 6,718,476 B1
(45) Date of Patent: Apr. 6, 2004

(54) METHOD OF SYNCHRONIZING EACH LOCAL CLOCK TO A MASTER CLOCK IN A DATA BUS SYSTEM

(75) Inventor: Hisato Shima, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 561 days.

(21) Appl. No.: 09/724,208

(22) Filed: Nov. 27, 2000

(51) Int. Cl.[7] .............................. G06F 1/10; H04L 7/00
(52) U.S. Cl. .......................... 713/400; 713/1; 375/371; 375/356; 375/354
(58) Field of Search ...................... 713/1, 400; 375/354, 375/356, 371; 370/516

(56) References Cited

U.S. PATENT DOCUMENTS

| | | | |
|---|---|---|---|
| 4,939,752 A | * | 7/1990 | Literati et al. ............... 370/238 |
| 5,068,877 A | * | 11/1991 | Near et al. ................... 375/356 |
| 5,870,441 A | * | 2/1999 | Cotton et al. ............... 375/354 |

FOREIGN PATENT DOCUMENTS

| | | | |
|---|---|---|---|
| JP | 2000358018 A | * 12/2000 | ............. H04L/7/00 |

OTHER PUBLICATIONS

IEEE Standard for a High Performance Serial Bus, IEEE Std. 1394–1995, Jul. 22, 1996, pp. 16–45.*

* cited by examiner

Primary Examiner—Thomas Lee
Assistant Examiner—Mark Connolly
(74) Attorney, Agent, or Firm—Wagner, Murabito & Hao LLP

(57) ABSTRACT

A method of synchronizing each local clock to a master clock in a data bus system is described. In an embodiment, the data bus system includes a plurality of nodes each having a local clock. Initially, a clock source for each local clock is the respective local clock generator of each node. During formation of a data bus configuration for the data bus system, each node assigns either a first identifier or a second identifier to each port that is coupled to another port. If a node has a first identifier port, the node changes a clock source for its local clock from the local clock generator to a particular clock recovery circuit that is coupled to the first identifier port. In another embodiment, a clock source for each local clock is initially the respective multiple mode clock recovery circuit (MMCRC) operating in the unlocked mode. During formation of a data bus configuration for the data bus system, each node assigns either a first identifier or a second identifier to each port that is coupled to another port. If a node has a first identifier port, the node changes a clock source for its local clock from the MMCRC operating in the unlocked mode to the MMCRC operating in the locked mode, which is coupled to the first identifier port. The local clock of the root node serves as the master clock for synchronizing the local clocks of the other nodes.

50 Claims, 29 Drawing Sheets

AFTER SYNCHRONIZING CLKS

BEFORE SYNCHRONIZING CLKS

AFTER SYNCHRONIZING CLKS

BEFORE SYNCHRONIZING CLKS

AFTER SYNCHRONIZING CLKS

BEFORE SYNCHRONIZING CLKS

AFTER SYNCHRONIZING CLKS

METHOD OF SYNCHRONIZING EACH LOCAL CLOCK TO A MASTER CLOCK IN A DATA BUS SYSTEM

BACKGROUND OF THE INVENTION

1. Field of the Invention

The present invention generally relates to the field of data bus systems. More particularly, the present invention relates to the field of synchronizing local clocks in a data bus system.

2. Related Art

The 1394 Serial Bus Standard (or 1394 Standard) is a protocol for a high performance digital serial data bus. The 1394 Standard provides a versatile, high-speed method of interconnecting a variety of devices (e.g., computer system, digital camera, digital VCR, TV settop box, digital camcorder, storage device, digital audio device, etc.). Moreover, the 1394 Standard enables a wide range of applications, including desktop video editing, publishing, data storage, video conferencing, and home Audio/Video networking. Rapid embrace of the 1394 Standard has been spurred by the emergence of digital video and multimedia applications.

The 1394 Standard offers many advantages over other technologies. The major advantages include very high speed data transfer rates, self-configuring, plug-and-play operation, both asynchronous data transfer (guaranteed delivery) and isochronous data transfer (guaranteed bandwidth with low overhead), and flexible topology.

The 1394 Standard was originally adopted in 1995 as the 1394-1995 specification. Later, the original specification was revised, providing some clarification on the original specification, changing some optional portions of the original specification to mandatory, and adding some performance enhancements. The first revision was approved and is known as the 1394a specification. A second revision of the 1394 Standard is known as the 1394b specification. The 1394b specification represents a significant enhancement of the 1394 Standard.

FIG. 1 illustrates the well-known protocol layers of the 1394 Standard, whereas each device compliant with the 1394 Standard implements the protocol layers. The 1394 Standard includes a transaction layer 20, a link layer 30, a physical layer 40, and a serial bus management layer 60. The protocol layers interact and interface with the host 10 (e.g., processor, PCI Bus, application, etc.) and with the 1394 connector, whereas the 1394 connector physically couples one device to another device. Each protocol layer is implemented as circuitry, software, or both.

The physical layer 40 is responsible for the clocking scheme of the 1394 Standard. The physical layer 40 maintains a local clock, whereas each device has a respective local clock. Data transmissions from a transmitting device to a receiving device are synchronized by the local clock of the transmitting device. The transmitting device transmits data and its local clock to the receiving device. The receiving device recovers the local clock of the transmitting device and utilizes the recovered local clock to recover the data transmitted by the transmitting device.

FIG. 2 illustrates a conventional 1394b data bus system 200 according to the prior art, showing the conventional clocking scheme of the prior art. The conventional 1394b data bus system 200 includes a plurality of nodes 210A–210F. Each node is a device (e.g., computer system, digital camera, digital VCR, TV settop box, digital camcorder, storage device, digital audio device, etc.) which is compliant with the 1394b specification. One of the plurality of nodes is designated as a root node according to the 1394b specification. Here, node A 210A is the root node 210A.

Each node 210A–210F includes an oscillator 215A–215F for generating a respective local clock 220A–220F or CLK A–CLK F, whereas each local clock 220A–220F operates at a nominal frequency of 25 MHz. Moreover, each node 210A–210F includes a cycle counter 230A–230F for coordinating time dependent data (e.g., digital video data, digital audio data, etc.). Each cycle counter 230A–230F is incremented by a respective local clock 220A–220F. In addition, each node 210A–210F includes a buffer 240A–240F for storing data which is to be transmitted to another node or which has been received from another node.

Node A 210A includes a port 262A coupled to a phase locked loop 252A, a port 264A coupled to a phase locked loop 254A, and a port 266A coupled to a phase locked loop 256A. Node B 210B includes a port 262B coupled to a phase locked loop 252B and a port 264B coupled to a phase locked loop 254B. Node C 210C includes a port 262C coupled to a phase locked loop 252C. Node D 210D includes a port 262D coupled to a phase locked loop 252D. Node E 210E includes a port 262E coupled to a phase locked loop 252E and a port 264E coupled to a phase locked loop 254E. Node F 210F includes a port 262F coupled to a phase locked loop 252F.

According to the 1394b specification, each node 210A–210F assigns a parent port identifier (illustrated by "P") to a port to indicate that a node which is closer to the root node 210A is coupled to that port. Moreover, each node 210A–210F assigns a child port identifier (illustrated by "C") to a port to indicate that a node which is farther away from the root node 210A is coupled to that port. For example, the port 262B of node B 210B is a parent port because port 262B is coupled to node A 210A, which is a node that is actually the root node 210A. Similarly, the port 262C of node C 210C is a parent port because port 262C is coupled to node B 210B, which is a node that is closer to the root node 210A. Moreover, the port 262A of node A 210A (the root node) is a child port because port 262A is coupled to node B 210B, which is a node that is farther from the root node 210A. Similarly, the port 264B of node B 210B is a child port because port 264B is coupled to node C 210C, which is a node that is farther from the root node 210A.

Node A 210A transmits data via data connections 271, 276, and 278. Node B 210B transmits data via data connections 272 and 273. Node C 210C transmits data via data connection 274. Node D 210D transmits data via data connection 275. Node E 210E transmits data via data connections 277 and 270. Node F 210F transmits data via data connection 279. Each data connection 270–279 is a twisted wire pair.

According to the 1394b specification, a transmitting node (e.g., node A 210A) uses its local clock (e.g., CLK A) to synchronize transmission of data packets to the receiving node (e.g., node B 210B) via a data connection (e.g., data connection 271). The transmitting node (e.g., node A 210A) encodes on a single twisted wire pair (e.g., data connection 271) the data packets and its local clock (e.g., CLK A) using a 8B10B coding. The receiving node (e.g., node B 210B) utilizes a phase locked loop (e.g., phase locked loop 252B) (which is coupled to the port that is coupled to the transmitting node) to recover the local clock (e.g., CLK A) of the transmitting node (e.g., node A 210A). The receiving node (e.g., node B 210B) utilizes the recovered local clock (e.g., CLK A) to recover the data packets transmitted via a data connection (e.g., data connection 271). If the receiving node (e.g., node B 210B) retransmits the data packets to another node (e.g., node C 210C), the receiving/retransmitting node (e.g., node B 210B) uses its local clock (e.g., CLK B) to synchronize transmission of data packets to a second receiving node (e.g., node C 210C) via a data connection (e.g., data connection 273). The receiving/retransmitting node (e.g., node B 210B) encodes on a single twisted wire pair (e.g., data connection 273) the data packets and its local clock (e.g., CLK B) using a 8B10B coding. The second receiving node (e.g., node C 210C) utilizes a phase locked loop (e.g., phase locked loop 252C) (which is coupled to the port that is coupled to the receiving/retransmitting node) to recover the local clock (e.g., CLK B) of the receiving/retransmitting node (e.g., node B 210B). The second receiving node (e.g., node C 210C) utilizes the recovered local clock (e.g., CLK B) to recover the data packets transmitted via a data connection (e.g., data connection 273).

In order to provide a common time reference, a cycle master which is typically the root node 210A synchronizes the cycle counters 230B–230F of the other nodes 210B–210F to the cycle counter 230A of the cycle master (the root node 210A). The root node 210A transmits a cycle start packet every 125 microseconds (or at the start of an isochronous cycle) to the receiving nodes (node B 210B, node D 210D and node E 210E) via data connections 271, 276, and 278. The cycle start packet is transmitted as described above. The cycle start packet includes the value of the cycle counter 230A of the root node 210A. The receiving nodes (node B 210B, node D 210D and node E 210E) copy the value of the cycle counter 230A of the root node 210A to their respective cycle counter 230B, 230D, and 230E. Moreover, the receiving nodes (node B 210B and node E 210E) retransmit the cycle start packet to node C 210C and node F 210F, respectively, so that node C 210C and node F 210F are able to copy the value of the cycle counter 230A of the root node 210A to their respective cycle counter 230C and 230F.

Since the cycle start packet is synchronized to the local clock at each intermediate node prior to retransmission, a propagation time is introduced to the cycle start packet. This propagation time is a source of jitter in the respective cycle counters of the nodes. Moreover, the respective cycle counters 230B–230F (which are incremented by respective local clocks CLK B–CLK F) can lead or lag the cycle counter 230A of the root node 210A prior to receiving the cycle start packet. This translates directly to jitter in the respective cycle counters 230B–230F, causing distortion in any data processing operation that uses the respective cycle counter 230B–230F as a time reference.

FIGS. 3A–3D illustrate the relationship over a period of time between the local clocks of the nodes of the conventional 1394b data bus system of FIG. 2, showing the source of jitter in the respective cycle counter of the nodes. As discussed above, each local clock operates at a nominal frequency of 25 MHz. CLK A is the local clock of the root node 210A, whereas the cycle counter 230A of the root node 210A is incremented by CLK A. As described above, the root node 210A synchronizes the cycle counters 230B–230F of the other nodes 210B–210F to its cycle counter 230A by transmitting a cycle start packet that has the value of the cycle counter 230A of the root node 210A. CLK B is the local clock of node B 210B. CLK C is the local clock of node C 210C.

At t=T1 (FIG. 3A), CLK B leads CLK A by b1 seconds. At t=T2 (FIG. 3B), CLK B lags CLK A by b2 seconds. At t=T3 (FIG. 3C), CLK B lags CLK A by b3 seconds, where as b2>b3. At t=T4 (FIG. 3D), CLK B leads CLK A by b4 seconds, whereas b1>b4.

At t=T1 (FIG. 3A), CLK C lags CLK A by c1 seconds. At t=T2 (FIG. 3B), CLK C leads CLK A by c2 seconds. At t=T3 (FIG. 3C), CLK C leads CLK A by c3 seconds, where as c2>c3. At t=T4 (FIG. 3D), CLK C lags CLK A by c4 seconds, whereas c4>c1.

FIGS. 3A–3D illustrate that the phase of CLK B with respect to CLK A drifts over time. Moreover, FIGS. 3A–3D illustrate that the phase of CLK C with respect to CLK A drifts over time.

These clock phase drifts cause the propagation time of the cycle start packet to fluctuate and cause the cycle counters 230B–230F to drift with respect to the cycle counter 230A of the root node 210A prior to receiving the cycle start packet, resulting in jitter in the cycle counters 230B–230F of nodes 210B–210F; It is difficult to filter out this jitter. Since the cycle counter provides a common timing reference for processing data packets, the jitter distorts and degrades the processing of the data packets. In particular, if the data packets include digital audio data, the jitter distorts and degrades the sound reproduced with the digital audio data.

SUMMARY OF THE INVENTION

A method of synchronizing each local clock to a master clock in a data bus system is described. In an embodiment, the data bus system includes a plurality of nodes each having a local clock, whereas the data bus system is compliant with the 1394b specification. In addition, each node includes a local clock generator, one or more ports, and one or more clock recovery circuits each coupled to a respective port. Initially, a clock source for each local clock is the respective local clock generator of each node.

During formation of a data bus configuration for the data bus system, each node assigns either a first identifier or a second identifier to each port that is coupled to another port. The first identifier is a parent port and the second identifier is a child port. If a node has a first identifier port, the node changes a clock source for its local clock from the local clock generator to a particular clock recovery circuit that is coupled to the first identifier port. The particular clock recovery circuit recovers a transmitted local clock of a transmitting node that is coupled to the first identifier port, whereas the transmitting node has a second identifier port which couples to the first, identifier port. The plurality of nodes includes a root node, whereas the root node does not have a first identifier port and has at least one second identifier port for transmitting its local clock to another node. Hence, the local clock of the root node serves as the master clock for synchronizing the local clocks of the other nodes, reducing jitter in the cycle counters of the nodes when the cycle counters are updated with the value of the cycle counter of the root node.

In another embodiment, the data bus system includes a plurality of nodes each having a local clock, whereas the data bus system is compliant with the 1394b specification. In addition, each node includes one or more ports and a multiple mode clock recovery circuit, whereas the multiple mode clock recovery circuit operates in each of a plurality of modes including a locked mode and an unlocked mode. Initially, a clock source for each local clock is the respective multiple mode clock recovery circuit (of each node) operating in the unlocked mode.

During formation of a data bus configuration for the data bus system, each node assigns either a first identifier or a second identifier to each port that is coupled to another port. The first identifier is a parent port and the second identifier is a child port. If a node has a first identifier port, the node changes a clock source for its local clock from the multiple mode clock recovery circuit operating in the unlocked mode to the multiple mode clock recovery circuit operating in the locked mode. The multiple mode clock recovery circuit operating in the locked mode recovers a transmitted local clock of a transmitting node that is coupled to the first identifier port, whereas the transmitting node has a second identifier port which couples to the first identifier port. The plurality of nodes includes a root node, whereas the root node does not have a first identifier port and has at least one second identifier port for transmitting its local clock to another node. Hence, the local clock of the root node serves as the master clock for synchronizing the local clocks of the other nodes, reducing jitter in the cycle counters of the nodes when the cycle counters are updated with the value of the cycle counter of the root node.

These and other advantages of the present invention will no doubt become apparent to those of ordinary skill in the art after having read the following detailed description of the preferred embodiments which are illustrated in the drawing figures.

In one embodiment, the present invention includes a method of synchronizing a plurality of local clocks in a data bus system having a plurality of nodes, each node having one of the plurality of local clocks, the method comprising the steps of: a) initiating formation of a data bus configuration for the data bus system, wherein each node includes a local clock generator, at least one port, and at least one clock recovery circuit coupled to a respective port, wherein a coupled port represents a port coupled to another port; b) for each node, assigning each coupled port one of a plurality of identifiers based on predetermined criteria the identifiers including a first identifier and a second identifier; and c) for each node which has a first identifier port, changing a clock source for a respective local clock of the node from a respective local clock generator of the node to a particular clock recovery circuit of the node, wherein the particular clock recovery circuit recovers a transmitted local clock of a transmitting node coupled to the first identifier port via a second identifier port.

In another embodiment, the present invention includes a method of synchronizing a plurality of local clocks in a data bus system having a plurality of nodes, each node having one of the plurality of local clocks, the method comprising the steps of: a) initiating formation of a data bus configuration for the data bus system, wherein each node includes at least one port and a multiple mode clock recovery circuit (MMCRC), wherein the MMCRC operates in each of a plurality of modes the modes including a locked mode and an unlocked mode, wherein a coupled port represents a port coupled to another port; b) for each node, assigning each coupled port one of a plurality of identifiers based on predetermined criteria the identifiers including a first identifier and a second identifier; and c) for each node which has a first identifier port, changing a clock source for a respective local clock of the node from the MMCRC operating in the unlocked mode to the MMCRC operating in the locked mode, wherein the MMCRC operating in the locked mode recovers a transmitted local clock of a transmitting node coupled to the first identifier port via a second identifier port.

BRIEF DESCRIPTION OF THE DRAWINGS

The accompanying drawings, which are incorporated in and form a part of this specification, illustrate embodiments of the invention and, together with the description, serve to explain the principles of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Although the discussion will focus on a 1394b data bus system having a plurality of nodes (each node compliant with the 1394b specification), the present invention is applicable to data bus systems compliant with other standards. Each node is a device (e.g., computer system, digital camera, digital VCR, TV settop box, digital camcorder, storage device, digital audio device, etc.) which is compliant with the 1394b specification.

Figure 1:
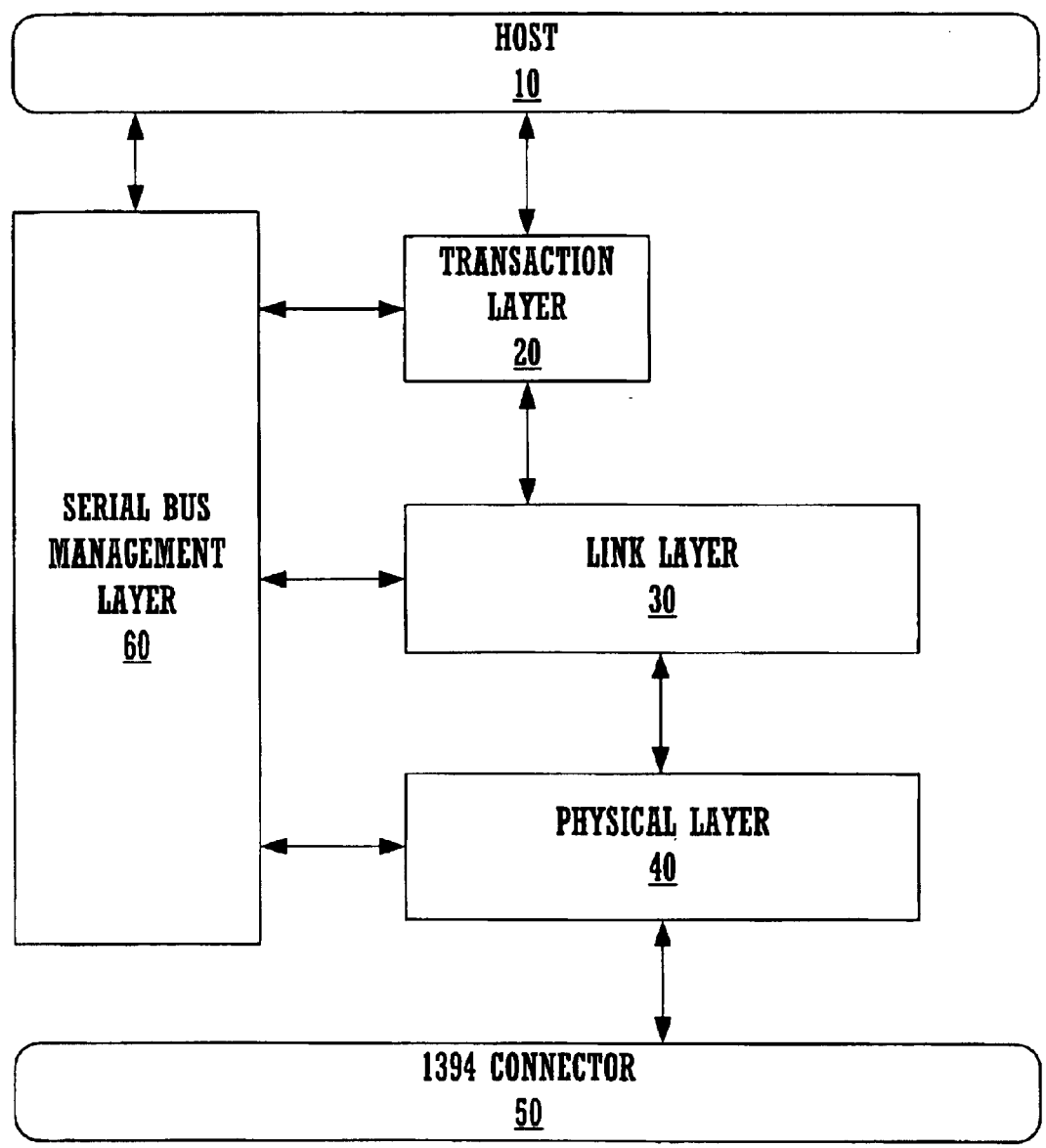
FIG. 1 illustrates the well-known protocol layers of the 1394 Standard, whereas each device compliant with the 1394 Standard implements the protocol layers.
Figure 2:
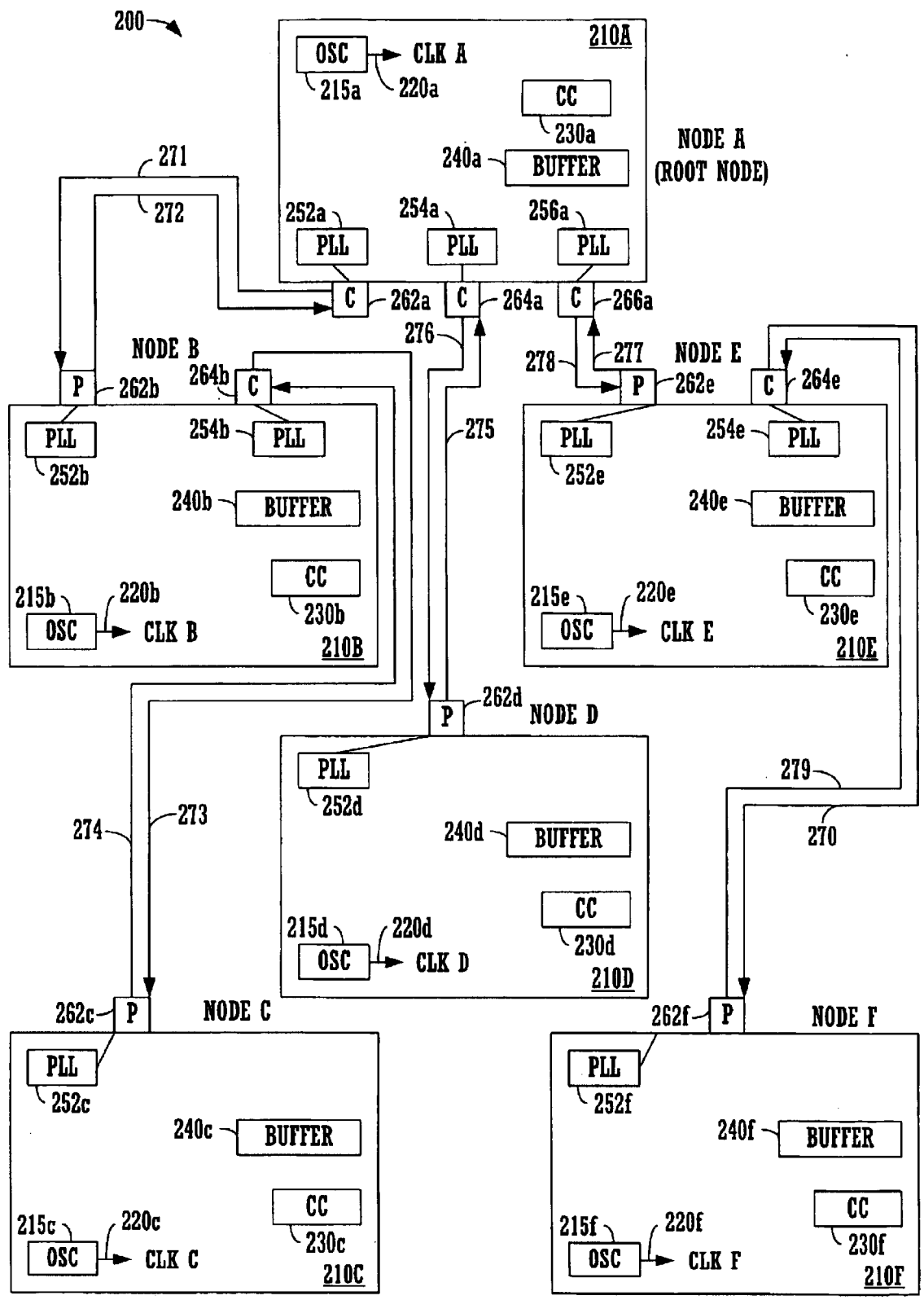
FIG. 2 illustrates a conventional 1394b data bus system 200 according to the prior art, showing the conventional clocking scheme of the prior art.
Figure 3A:
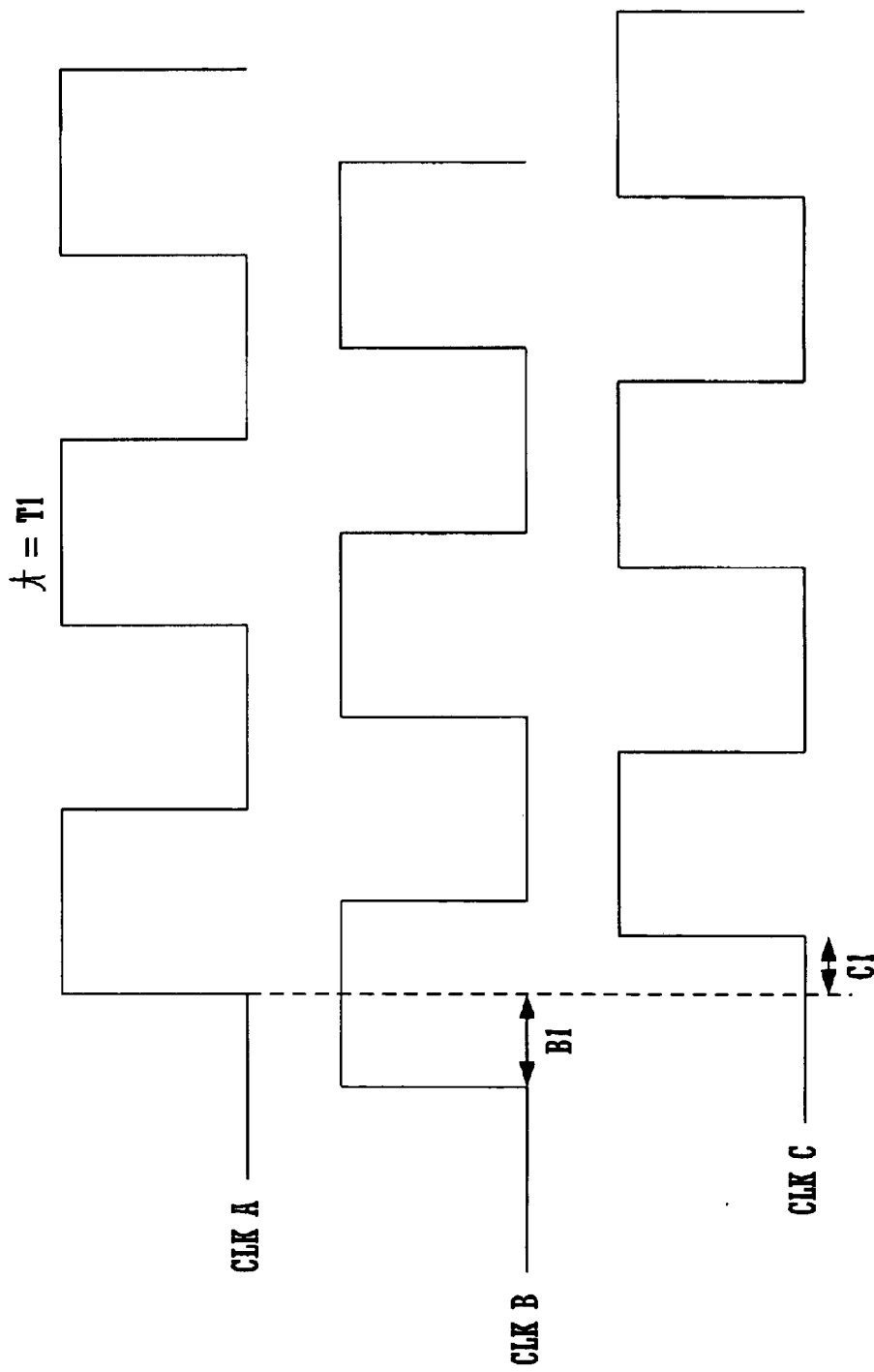
FIGS. 3A, 3B, 3C, and 3D illustrate the relationship over time between the local clocks of the nodes of the conventional 1394b data bus system of FIG. 2, showing the source of jitter in the respective cycle counter of the nodes.
Figure 3B:
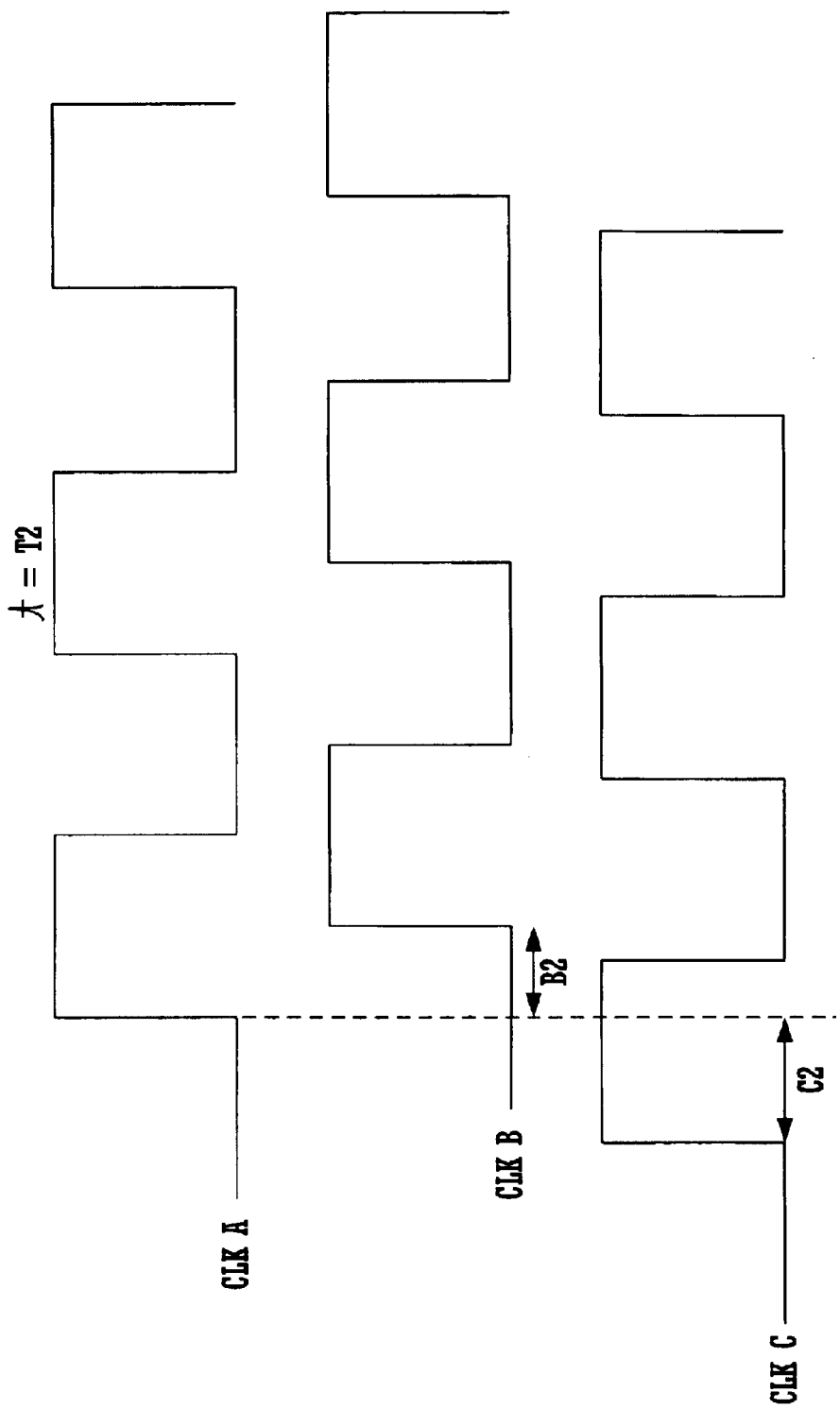
Figure 3C:
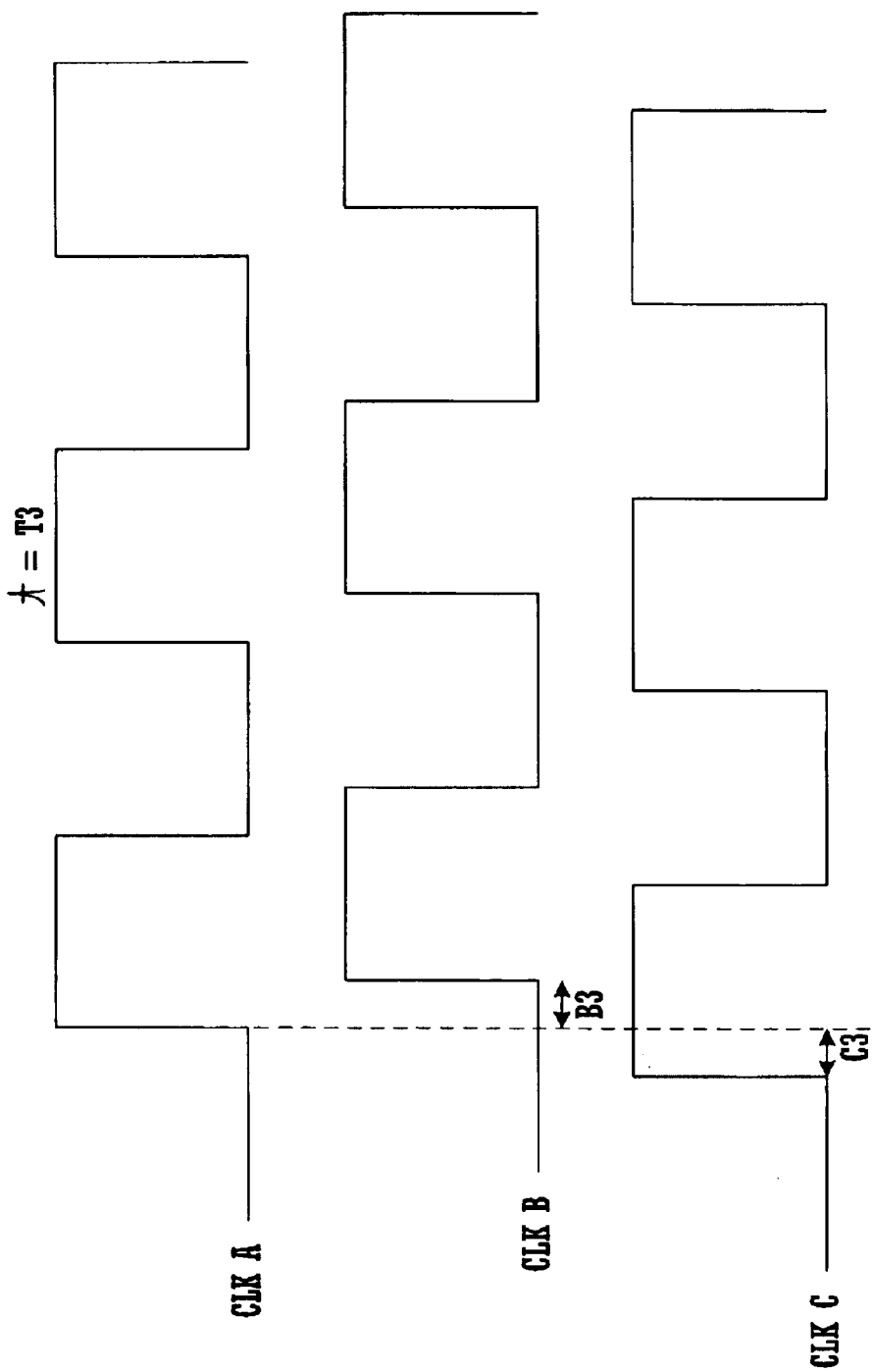
Figure 3D:
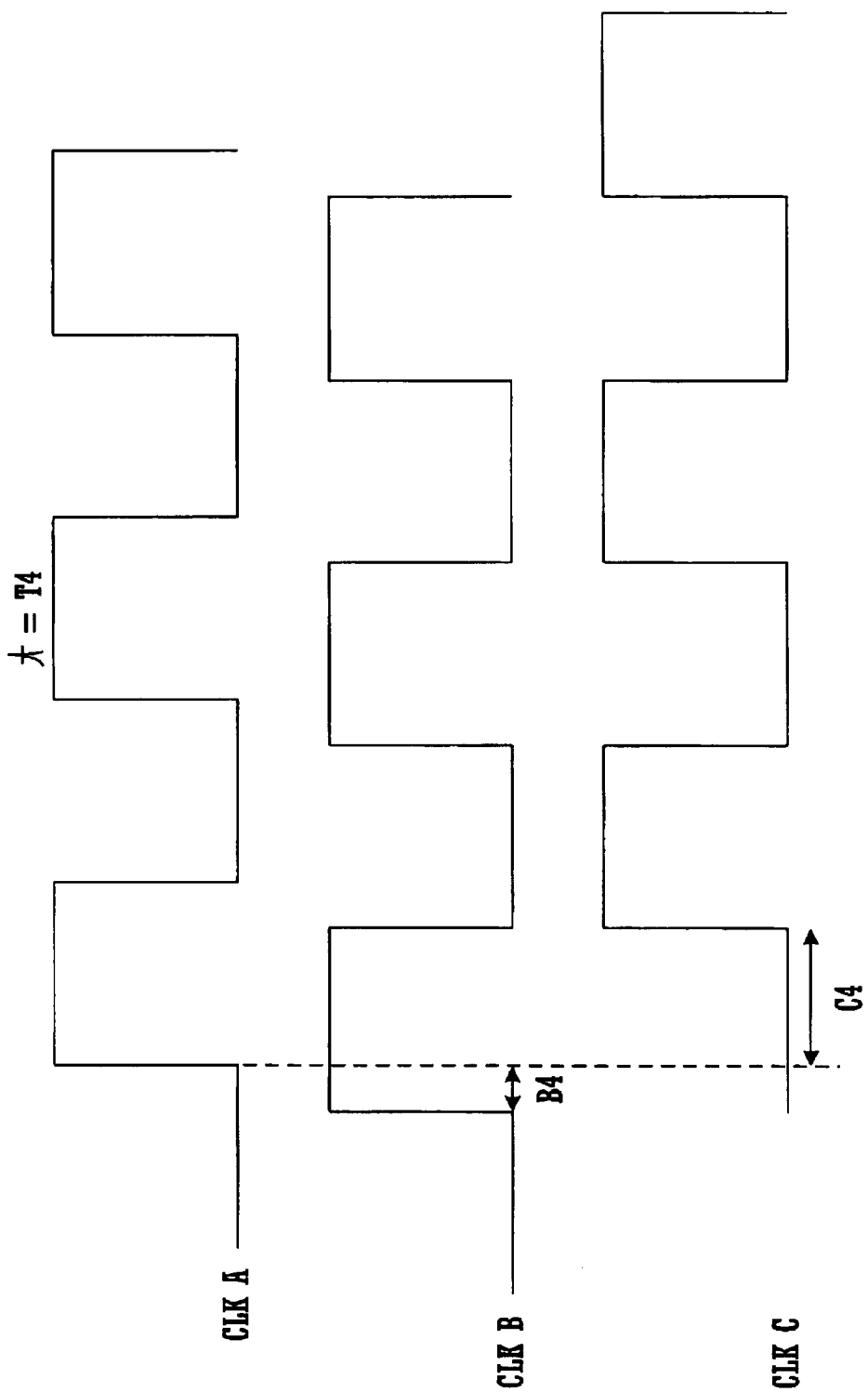
Figure 4A:
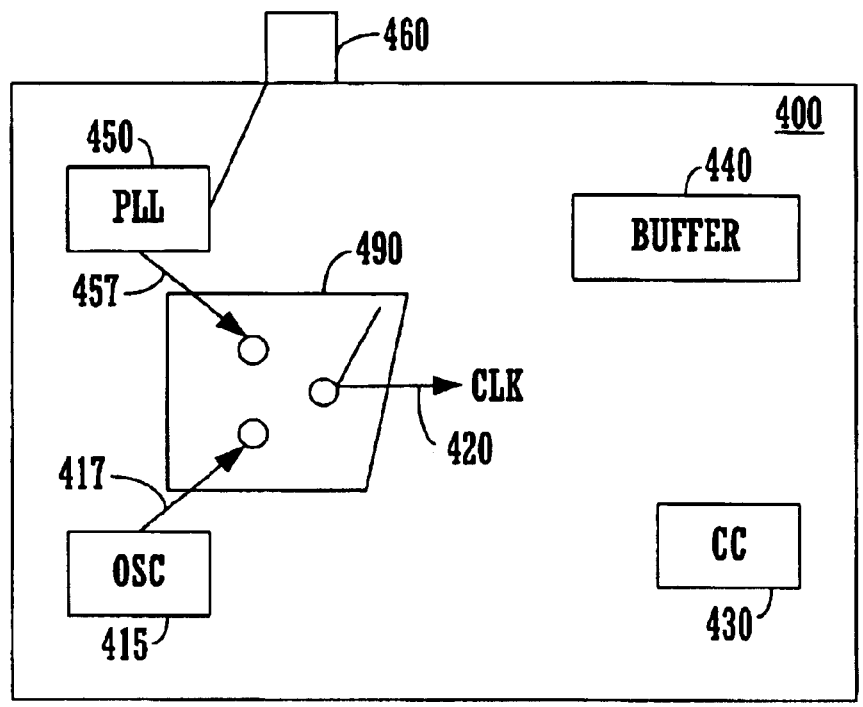
FIG. 4A illustrates a node according to an embodiment of the present invention, showing a local clock and one port.

FIG. 4A illustrates a node 400 according to an embodiment of the present invention, showing a local clock CLK and one port. In an embodiment, the node 400 is compliant with the 1394b specification. A plurality of nodes (each node configured similarly to node 400) are coupled together to form a 1394b data bus system according an embodiment of the present invention. As discussed above, the 1394 Standard (including the 1394-1995 specification, the 1394a specification, and the 1394b specification) is comprised of a transaction layer, a link layer, a physical layer, and a serial bus management layer, whereas each protocol layer is implemented as circuitry, software, or both. The local clock CLK is implemented in the physical layer of the 1394b specification.

In an embodiment, the node 400 includes a local clock generator 415, a port 460, and a clock recovery circuit 450 coupled to the port 460. In addition, the node 400 includes a buffer 440 and a cycle counter 430. The port 460 facilitates coupling the node 400 to another port of another node. It should be understood that the node 400 can have more than one port, whereas each port is coupled to a separate clock recovery circuit. The clock recovery circuit 450 recovers a local clock that is transmitted by a transmitting node, that is coupled to the port 460. The transmitting node encodes data packets together with its local clock using a 8B10B coding prior to transmitting the data packets and its local clock. The recovered local clock can operate as the clock source for the local clock CLK of the node 400. In an embodiment, the clock recovery circuit 450 comprises a phase locked loop 450. It should be understood that the clock recovery circuit 450 can be implemented in any other manner.

In an embodiment, the local clock generator 415 comprises a crystal oscillator 415. The local clock generator 415 generates a signal which can operate as the clock source for the local clock CLK of the node 400. It should be understood that the local clock generator 415 can be implemented in any other manner.

The cycle counter 430 facilitates coordinating time dependent data (e.g., digital video data, digital audio data, etc.), as described above. The cycle counter 430 is incremented by the local clock CLK. In addition, the buffer 440 enables storing data which is to be transmitted to another node or which has been received from another node.

In an embodiment, the node 400 has a clock source selection circuit 490. The clock source selection circuit 490 is coupled to an output terminal 457 of the clock recovery circuit 450 and is coupled to an output terminal 417 of the local clock generator 415. The clock source selection circuit 490 has an output terminal 420, whereas the output terminal 420 provides the local clock CLK for the node 400. In an embodiment, the node 400 selectively couples the output terminal 420 of the clock source selection circuit 490 to either the clock recovery circuit 450 or the local clock generator 415, facilitating synchronization of the local clock CLK to a master clock so that to reduce jitter in the cycle counter 430 of the node 400 and in the cycle counters of the other nodes when the cycle counters are updated with the value of the cycle counter of the root node. In an embodiment, the clock source selection circuit 490 comprises a switch 490. It should be understood that the clock source selection circuit 490 can be implemented in any other manner. It should be understood that the clock source for the local clock CLK can be changed using an implementation other than the clock source selection circuit 490.

Initially, the node 400 operates with the local clock CLK coupled to the output terminal 417 of the local clock generator 415 via the clock source selection circuit 490. When the node 400 is coupled to a 1394b data bus system, the node 400 participates in establishing a data bus configuration for the 1394b data bus system. One of the nodes in the 1394b data bus system is designated the root node. When forming the data bus configuration, the node 400 as well as the other nodes in the 1394b data bus system assign either a first identifier or a second identifier to their respective ports that are coupled to another port. In an embodiment, the first identifier is a parent port and the second identifier is a child port. The parent port identifier is assigned to a port to indicate that a node which is closer to the root node is coupled to that port. Moreover, a child port identifier is assigned to a port to indicate that a node which is farther away from the root node is coupled to that port.

In an embodiment of the present invention, if the node 400 assigns a parent port identifier to its port 460, the node 400 changes the clock source for its local clock CLK via the clock source selection circuit 490. In particular, the clock source selection circuit 490 couples the output terminal 457 of the clock recovery circuit 450 to the local clock CLK of the node 400 rather than coupling the output terminal 417 of the local clock generator 415 to the local clock CLK of the node 400, whereas the clock recovery circuit 450 recovers the local clock of the transmitting node coupled to the port 460 (the parent port) of the node 400. Hence, the recovered local clock operates as the clock source for the local clock CLK of the node 400, enabling synchronization of the local clock CLK of the node 400 and of the local clocks of the other nodes. As will be described below, the root node assigns a child port identifier to its port or ports, maintaining its local clock coupled to the output terminal of its local clock generator via its clock source selection circuit. The root node is coupled to at least one parent port of another node and transmits its local clock via its child port to the parent port of another node. Therefore, the local clock of the root node serves as the master clock for synchronizing the local clocks of the other nodes, reducing jitter in the cycle counters of the nodes when the cycle counters are updated with the value of the cycle counter of the root node.

Figure 4B:
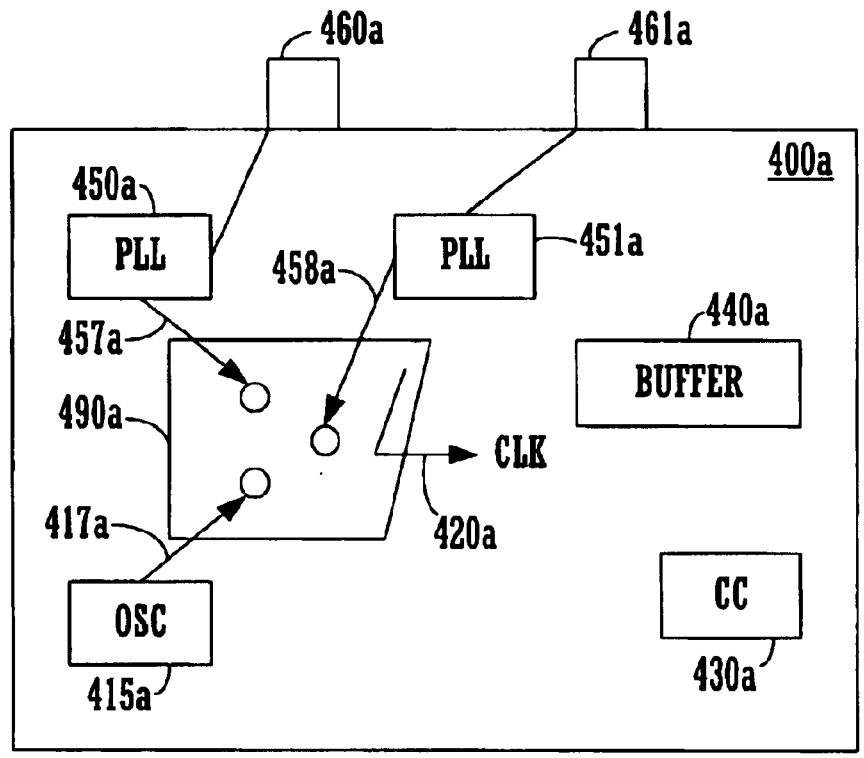
FIG. 4B illustrates a node according to an embodiment of the present invention, showing a local clock and multiple ports.

FIG. 4B illustrates a node 400A according to an embodiment of the present invention, showing a local clock CLK and multiple ports 460A and 461A. The node 400A includes a first port 460A, a second port 461A, a buffer 440A, a cycle counter 430A, a first clock recovery circuit 450A coupled to the first port 460A, a second clock recovery circuit 451A coupled to the second port 461A, and a local clock generator 415A. The description of these elements with respect to node 400 in FIG. 4A is applicable to node 400A in FIG. 4B. In addition, node 400A includes a clock source selection circuit 490A. The clock source selection circuit 490A is coupled to an output terminal 457A of the first clock recovery circuit 450A, an output terminal 458A of the second clock recovery circuit 451A, and an output terminal 417A of the local clock generator 415A. The clock source selection circuit 490A has an output terminal 420A, whereas the output terminal 420A provides the local clock CLK for the node 400A. In an embodiment, the node 400A selectively couples the output terminal 420A of the clock source selection circuit 490A to the first clock recovery circuit 450A, the second clock recovery circuit 451A, or the local clock generator 415A. In an embodiment, the node can selectively couple the output terminal of the clock source selection circuit to any of the clock recovery circuits of the node and to the local clock generator of the node. The discussion of the operation and synchronization of the local clock with respect to node 400 of FIG. 4A is applicable to node 400A of FIG. 4B.

Figure 4C:
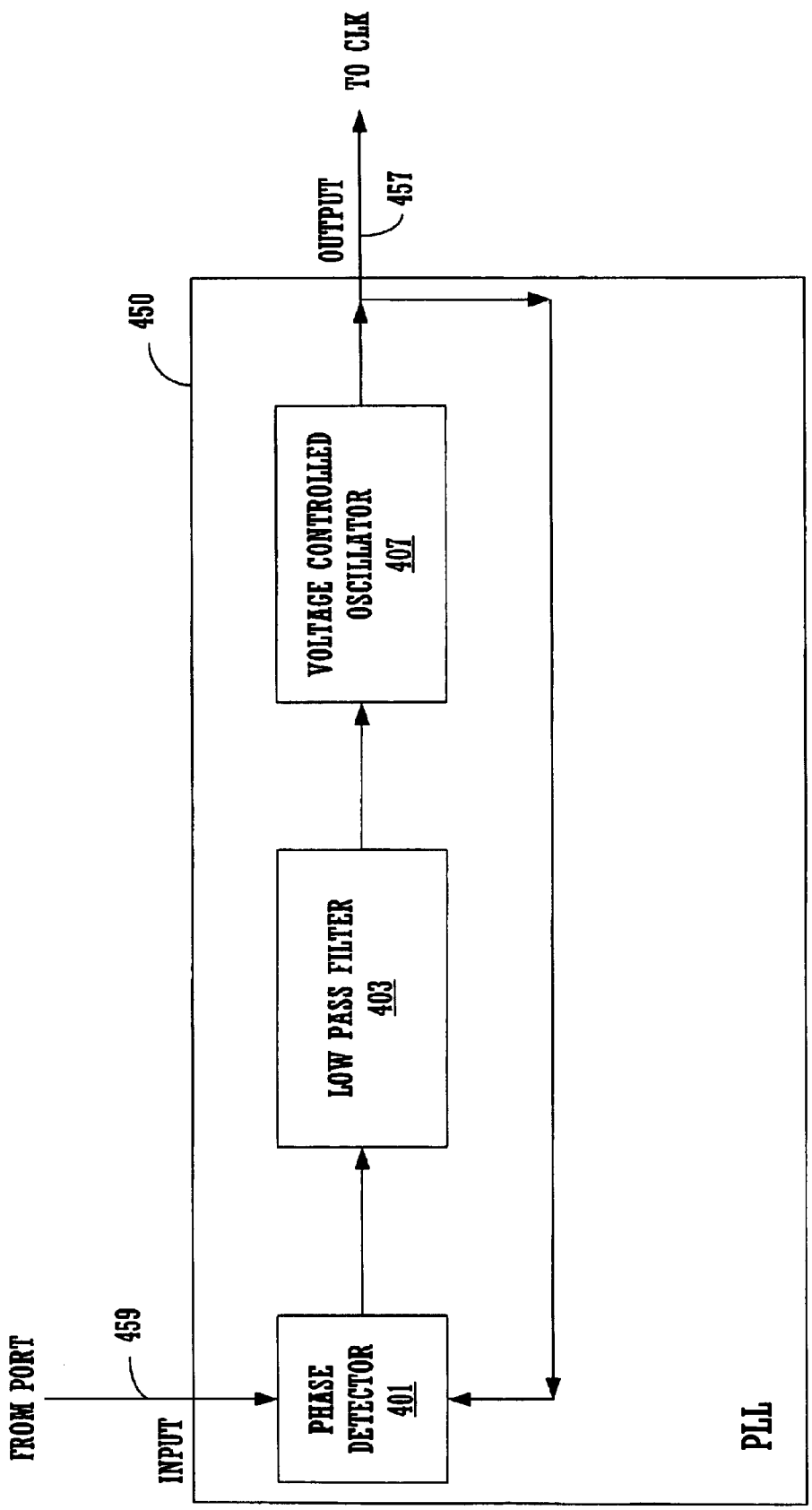
FIG. 4C illustrates a phase locked loop according to an embodiment of the present invention.

FIG. 4C illustrates a phase locked loop 450 according to an embodiment of the present invention. The phase locked loop 450 (or clock recovery circuit 450) of FIG. 4A and the phase locked loops 450A and 451A (first clock recovery circuit 450A and the second clock recovery circuit 451A) of FIG. 4B can be configured as illustrated in FIG. 4C. In an embodiment, the phase locked loop 450 includes an input terminal 459 coupled to a port (not shown), a phase detector 401 coupled to the input terminal 459, a low pass filter 403 coupled to the phase detector 401, a voltage controlled oscillator 407 coupled to the low pass filter 403 and to the phase detector 401, and an output terminal 457 coupled to the voltage controlled oscillator 407. In an alternate embodiment, the voltage controlled oscillator 407 is replaced by a voltage controlled crystal oscillator. The phase locked loop 450 recovers a local clock transmitted via the port coupled to the input terminal 459, as discussed above. The recovered local clock is outputted via the output terminal 457, thus capable of operating as the clock source for the local clock of a node. It should be understood that the phase locked loop 450 can be implemented in any other manner and can have other components.

Figure 5A:
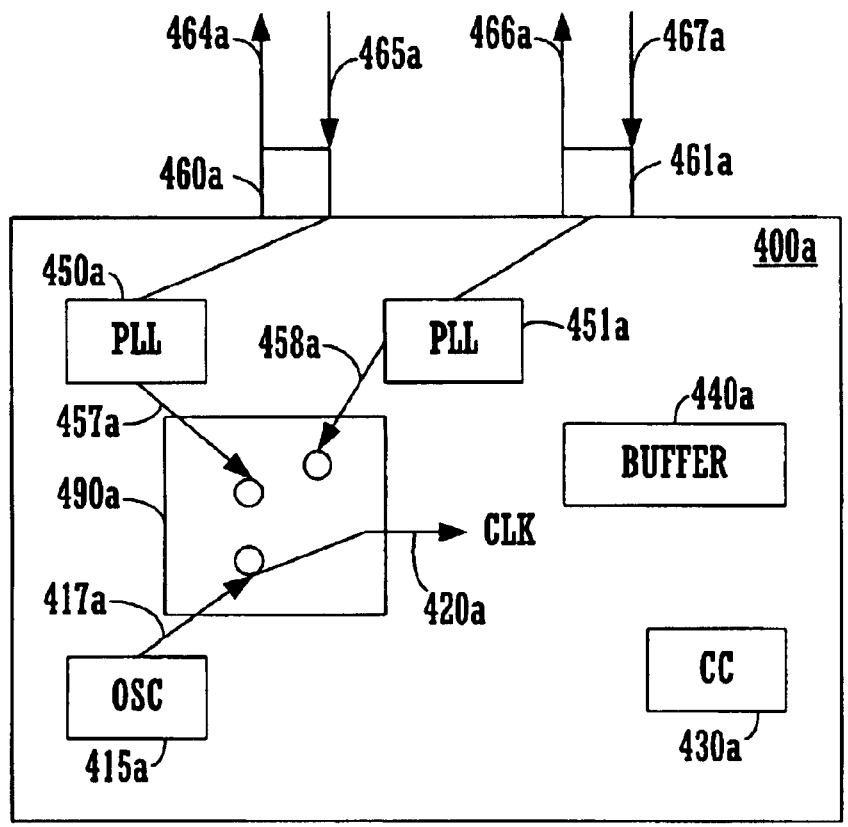
FIG. 5A illustrates a node according to an embodiment of the present invention, showing a local clock before clock synchronization.

FIG. 5A illustrates a node 400A in a 1394b data bus system according to an embodiment of the present invention, showing a local clock CLK before clock synchronization. The local clock CLK is implemented in the physical layer of the 1394b specification. The node 400A of FIG. 4B is illustrated in FIG. 5A. As illustrated in FIG. 5A, the node 400A is coupled to a first node (not shown) via port 460A and is coupled to a second node (not shown) via port 461A, whereas node 400A transmits data and its local clock CLK via data connections 464A and 466A. Node 400A receives data and the local clock of the first node via data connection 465A. Node 400A receives data and the local clock of the second node via data connection 467A. Moreover, since the node 400A has not assigned either a first identifier or a second identifier to its ports 460A and 461A, a data bus configuration for the 1394b data bus has not been established. In an embodiment, formation of the data bus configuration is initiated upon the occurrence of any event or condition specified in the 1394b specification (e.g., adding a node to the 1394b data bus system, removing a node from the 1394b data bus system, etc.). In an embodiment of the present invention, formation of the data bus configuration begins by performing a Bus Reset procedure as specified in the 1394b specification.

FIG. 5A illustrates the node 400A before its local clock CLK is synchronized to a master clock according to an embodiment of the present invention, whereas the master clock is the local clock of the root node as described above. Before the local clock CLK of node 400A is synchronized to the master clock, the local clock CLK is provided by the local clock generator 415A, whereas the clock source selection circuit 490A couples the output terminal 417A of the local clock generator 415A to the output terminal 420A of the clock source selection circuit 490A.

Figure 5B:
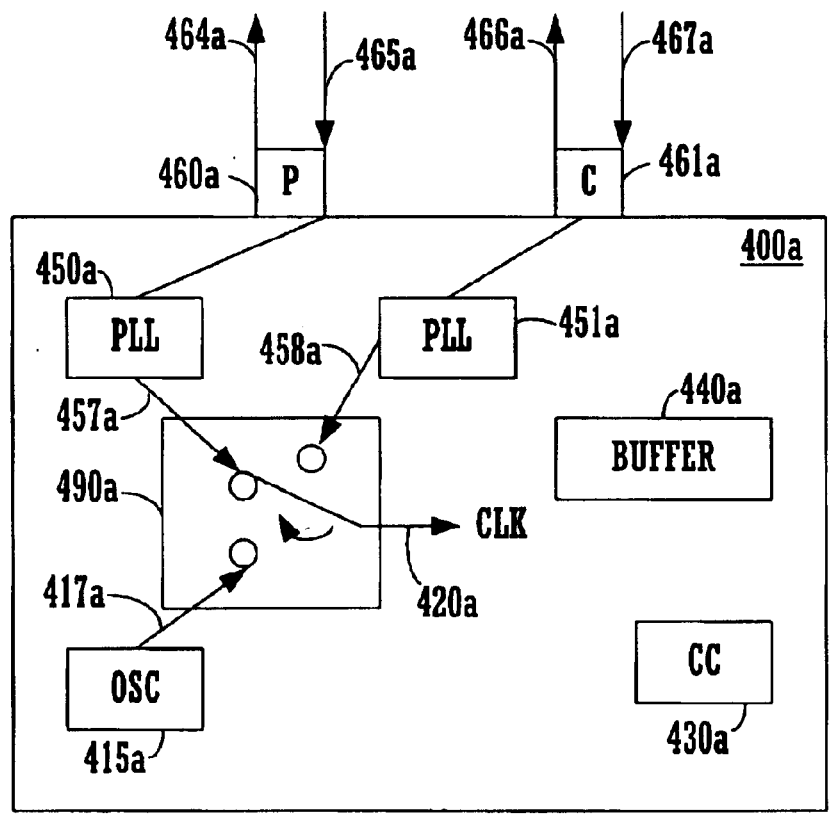
FIG. 5B illustrates a node according to an embodiment of the present invention, showing a local clock after clock synchronization.

FIG. 5B illustrates a node 400A in a 1394b data bus system according to an embodiment of the present invention, showing a local clock CLK after clock synchronization. The node 400A participates in establishing the data bus configuration for the 1394b data bus system. During formation of the data bus configuration for the 1394b data bus system, one of the nodes is designated as the root node as specified in the 1394b specification. Moreover, during formation of the data bus configuration for the 1394b data bus system, the node 400A assigns a parent port identifier (illustrated by "P") to port 460A to indicate that a node which is closer to the root node is coupled to that port 460A. In addition, the node 400A assigns a child port identifier (illustrated by "C") to port 461A to indicate that a node which is farther away from the root node is coupled to that port 461A. The parent port of one node couples to the child port of another node. The other nodes in the 1394b data bus system perform a similar operation. In an embodiment, the node 400A assigns the particular identifier to its ports 460A and 461A during a Tree Identification procedure as specified in the 1394b specification.

Since the node 400A has a port 460A that is assigned the parent port identifier, the node 400A synchronizes its local clock CLK by changing a clock source for its local clock CLK. If the node 400A does not have a port that is assigned the parent port identifier, the node 400A would continue to have the local clock generator 415A serve as the clock source for its local clock CLK. In an embodiment of the present invention, the root node is the node that does not have a port that is assigned the parent port identifier.

In order to synchronize the local clock CLK, the clock source selection circuit 490A (of node 400A) couples its output terminal 420A to the output terminal 457A of the first clock recovery circuit 450A (which is coupled to port 460A which is assigned the parent port identifier) instead of the output terminal 417A of the local clock generator 415A. The first clock recovery circuit 450A recovers the local clock transmitted via data connection 465A by the first node coupled to the port 460A. The recovered local clock serves as the clock source for the local clock CLK of the node 400A. The node 400A utilizes the local clock CLK (which is the recovered local clock of the first node) to increment the cycle counter 430A. Moreover, the node 400A utilizes the local clock CLK (which is the recovered local clock of the first node) to synchronize the transmission of data and its local clock CLK via data connections 464A and 466A during data transfer operations supported by the 1394b data bus system, whereas the node 400A encodes the data together with its local clock CLK using a 8B10B coding prior to transmitting the data and its local clock CLK. In addition, the node 400A utilizes the local clock CLK (which is the recovered local clock of the first node) to perform any other operation requiring the use of its local clock CLK. The other nodes in the 1394b data bus system perform a similar operation. In an embodiment, the node 400A changes a clock source for its local clock CLK during a Self Identification procedure as specified in the 1394b specification. In an embodiment of the present invention, the node 400A turns off or disables its local clock generator 415A.

In the data bus configuration for the 1394b data bus system according to an embodiment of the present invention, the root node maintains its local clock generator as the clock source for its local clock, transmitting its local clock via its port or ports (which are assigned the child port identifier) to at least one port (of the other nodes) that is assigned the parent port identifier. The other nodes (including node 400A) change the clock source for their local clocks such that a recovered local clock (which is outputted by a clock recovery circuit coupled to a port that is assigned the parent port identifier) serves as the clock source for the local clock of the other nodes (including node 400A). Therefore, the local clock of the root node serves as the master clock for synchronizing the local clocks of the other nodes, reducing jitter in the cycle counters of the nodes when the cycle counters are updated with the value of the cycle counter of the root node.

Figure 6A:
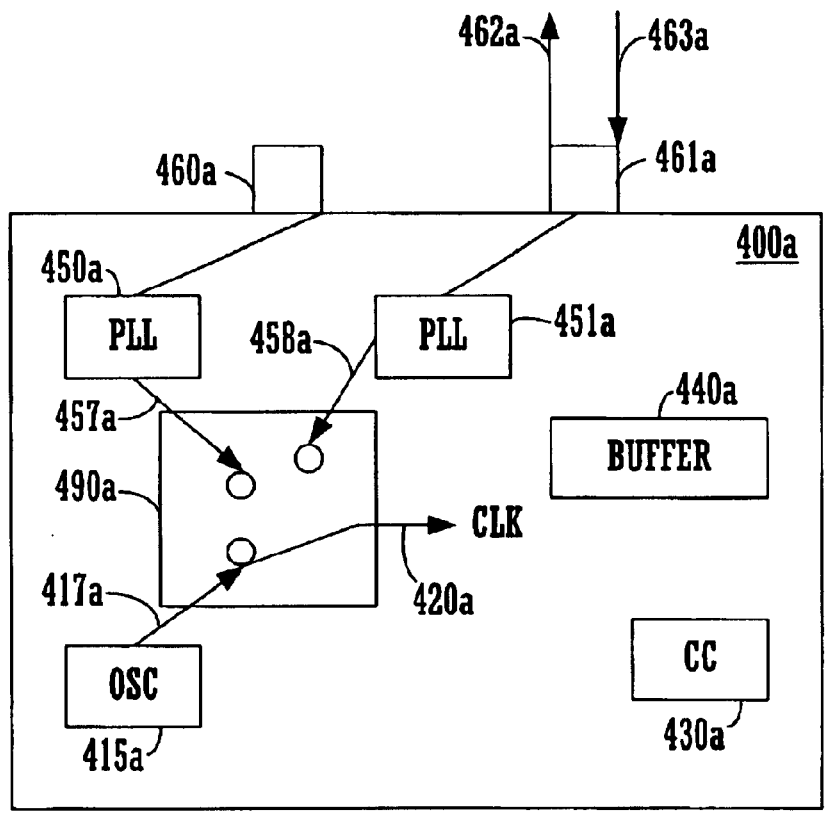
FIG. 6A illustrates a node according to an embodiment of the present invention, showing a local clock before clock synchronization.

FIG. 6A illustrates a node 400A in a 1394b data bus system according to an embodiment of the present invention, showing a local clock CLK before clock synchronization. The local clock CLK is implemented in the physical layer of the 1394b specification. The node 400A of FIG. 4B is illustrated in FIG. 6A. As illustrated in FIG. 6A, the node 400A is coupled to a first node (not shown) via port 461A, whereas node 400A transmits data and its local clock CLK via data connection 462A. Node 400A receives data and the local clock of the first node via data connection 463A. Moreover, since the node 400A has not assigned either a first identifier or a second identifier to its port 461A, a data bus configuration for the 1394b data bus has not been established. In an embodiment, formation of the data bus configuration is initiated upon the occurrence of any event or condition specified in the 1394b specification (e.g., adding a node to the 1394b data bus system, removing a node from the 1394b data bus system, etc.). In an embodiment of the present invention, formation of the data bus configuration begins by performing a Bus Reset procedure as specified in the 1394b specification.

FIG. 6A illustrates the node 400A before its local clock CLK is synchronized to a master clock according to an embodiment of the present invention, whereas the master clock is the local clock of the root node as described above. Before the local clock CLK of node 400A is synchronized to the master clock, the local clock CLK is provided by the local clock generator 415A, whereas the clock source selection circuit 490A couples the output terminal 417A of the local clock generator 415A to the output terminal 420A of the clock source selection circuit 490A.

Figure 6B:
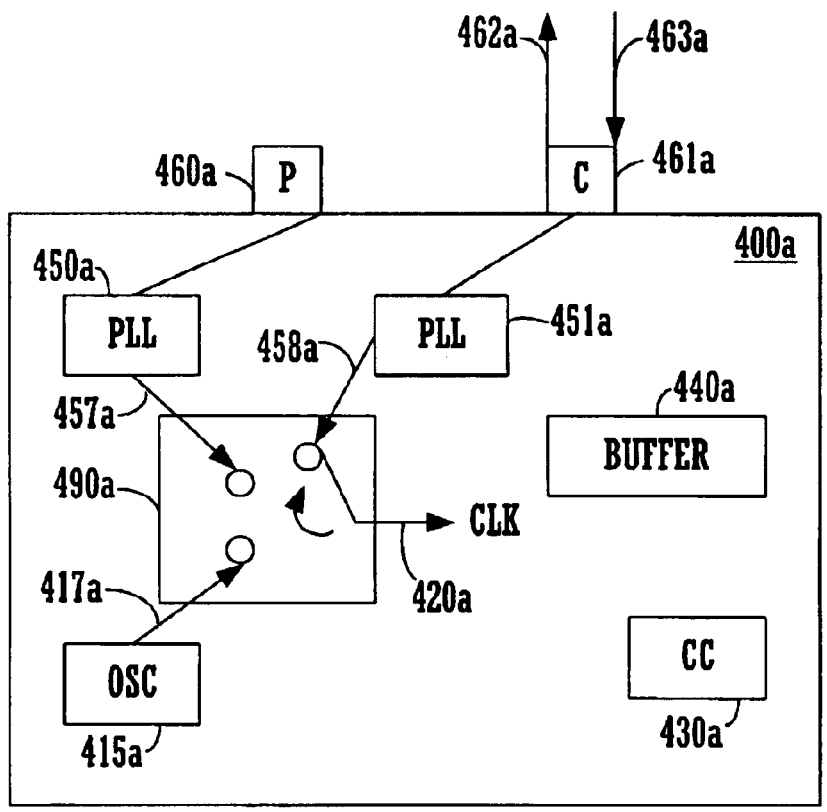
FIG. 6B illustrates a node according to an embodiment of the present invention, showing a local clock after clock synchronization.

FIG. 6B illustrates a node 400A in a 1394b data bus system according to an embodiment of the present invention, showing a local clock CLK after clock synchronization. The node 400A participates in establishing the data bus configuration for the 1394b data bus system. During formation of the data bus configuration for the 1394b data bus system, one of the nodes is designated as the root node as specified in the 1394b specification. Moreover, during formation of the data bus configuration for the 1394b data bus system, the node 400A assigns a parent port identifier (illustrated by "P") to port 461A to indicate that a node which is closer to the root node is coupled to that port 461A. The parent port of one node couples to the child port of another node. Since port 460A is not coupled to another node, node 400A does not assign a particular identifier to port 460A. The other nodes in the 1394b data bus system perform a similar operation. In an embodiment, the node 400A assigns the particular identifier to its port 461A during a Tree Identification procedure as specified in the 1394b specification.

Since the node 400A has a port 461A that is assigned the parent port identifier, the node 400A synchronizes its local clock CLK by changing a clock source for its local clock CLK. In order to synchronize the local clock CLK, the clock source selection circuit 490A (of node 400A) couples its output terminal 420A to the output terminal 458A of the second clock recovery circuit 451A (which is coupled to port 461A which is assigned the parent port identifier) instead of the output terminal 417A of the local clock generator 415A. The second clock recovery circuit 451A recovers the local clock transmitted via data connection 463A by the first node coupled to the port 461A. The recovered local clock serves as the clock source for the local clock CLK of the node 400A. The node 400A utilizes the local clock CLK (which is the recovered local clock of the first node) to increment the cycle counter 430A. Moreover, the node 400A utilizes the local clock CLK (which is the recovered local clock of the first node) to synchronize the transmission of data and its local clock CLK via data connection 462A during data transfer operations supported by the 1394b data bus system, whereas the node 400A encodes the data together with its local clock CLK using a 8B10B coding prior to transmitting the data and its local clock CLK. In addition, the node 400A utilizes the local clock CLK (which is the recovered local clock of the first node) to perform any other operation requiring the use of its local clock CLK. The other nodes in the 1394b data bus system perform a similar operation. In an embodiment, the node 400A changes a clock source for its local clock CLK during a Self Identification procedure as specified in the 1394b specification. In an embodiment of the present invention, the node 400A turns off or disables its local clock generator 415A.

Figure 7A:
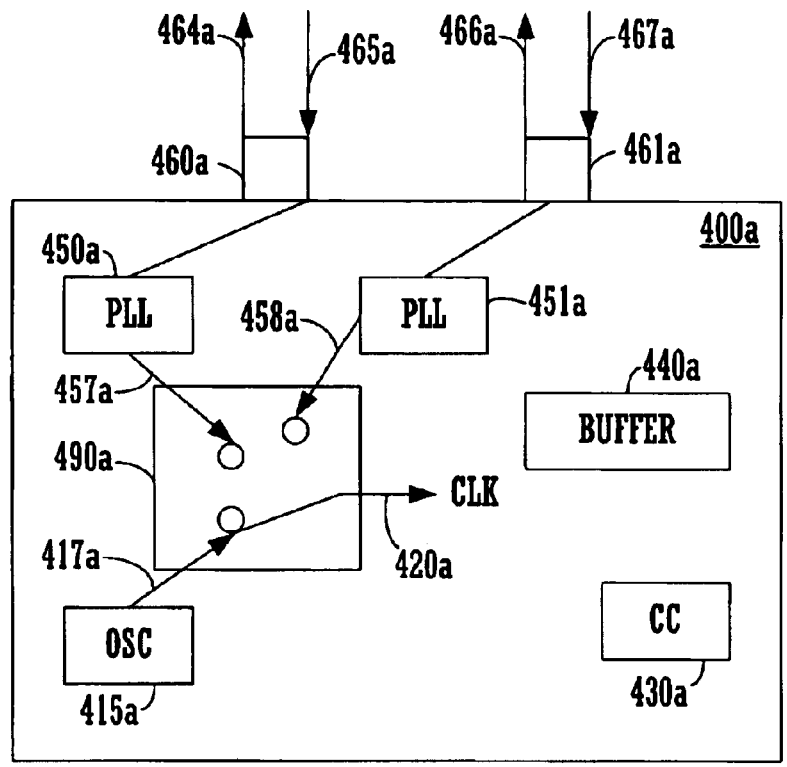
FIG. 7A illustrates a node according to an embodiment of the present invention, showing a local clock before clock synchronization.

FIG. 7A illustrates a node 400A in a 1394b data bus system according to an embodiment of the present invention, showing a local clock CLK before clock synchronization. The local clock CLK is implemented in the physical layer of the 1394b specification. The node 400A of FIG. 4B is illustrated in FIG. 7A. As illustrated in FIG. 7A, the node 400A is coupled to a first node (not shown) via port 460A and is coupled to a second node (not shown) via port 461A, whereas node 400A transmits data and its local clock CLK via data connections 464A and 466A. Node 400A receives data and the local clock of the first node via data connection 465A. Node 400A receives data and the local clock of the second node via data connection 467A. Moreover, since the node 400A has not assigned either a first identifier or a second identifier to its ports 460A and 461A, a data bus configuration for the 1394b data bus has not been established. In an embodiment, formation of the data bus configuration is initiated upon the occurrence of any event or condition specified in the 1394b specification (e.g., adding a node to the 1394b data bus system, removing a node from the 1394b data bus system, etc.). In an embodiment of the present invention, formation of the data bus configuration begins by performing a Bus Reset procedure as specified in the 1394b specification.

FIG. 7A illustrates the node 400A before its local clock CLK is synchronized to a master clock according to an embodiment of the present invention, whereas the master clock is the local clock of the root node as described above. Before the local clock CLK of node 400A is synchronized to the master clock, the local clock CLK is provided by the local clock generator 415A, whereas the clock source selection circuit 490A couples the output terminal 417A of the local clock generator 415A to the output terminal 420A of the clock source selection circuit 490A.

Figure 7B:
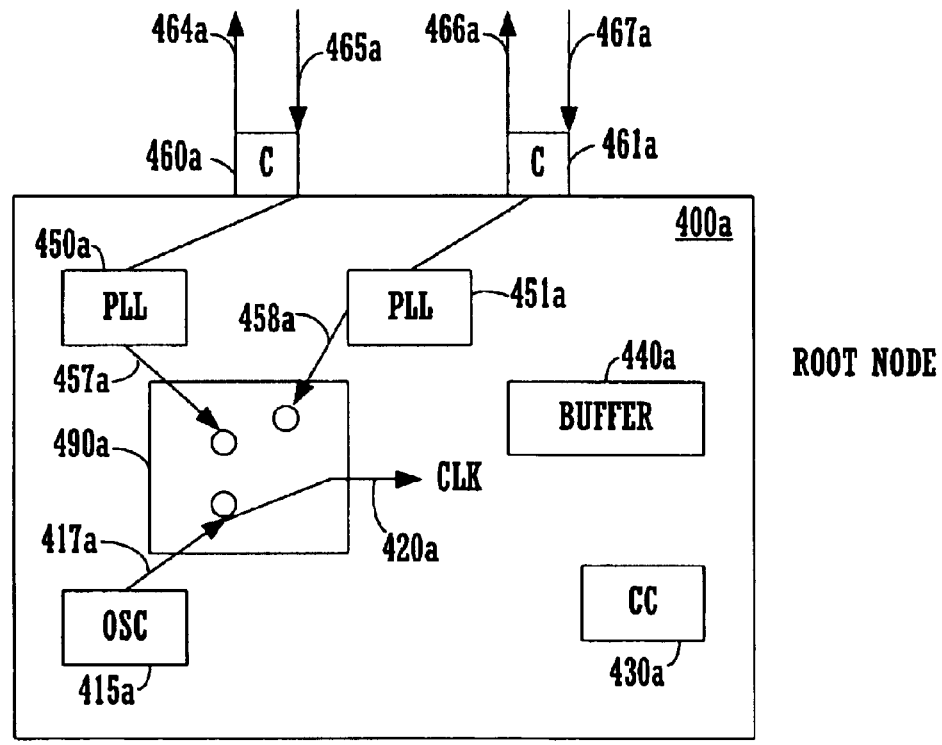
FIG. 7B illustrates a root node according to an embodiment of the present invention, showing a local clock after clock synchronization.

FIG. 7B illustrates a node 400A in a 1394b data bus system according to an embodiment of the present invention, showing a local clock CLK after clock synchronization and showing the node 400A designated as a root node. The node 400A participates in establishing the data bus configuration for the 1394b data bus system. During formation of the data bus configuration for the 1394b data bus system, the node 400A is designated as the root node as specified in the 1394b specification. Moreover, during formation of the data bus configuration for the 1394b data bus system, the node 400A (or root node) assigns a child port identifier (illustrated by "C") to ports 460A and 461A to indicate that a node which is farther away from the root node is coupled to ports 460A and 461A. The parent port of one node couples to the child port of another node. In an embodiment, the node 400A assigns the particular identifier to its ports 460A and 461A during a Tree Identification procedure as specified in the 1394b specification.

Since the node 400A does not have a port that is assigned the parent port identifier, the node 400A (or root node) continues to have its local clock generator 415A serve as the clock source for its local clock CLK. Moreover, node 400A (or root node) transmits its local clock CLK via its ports 460A and 461A (which are assigned the child port identifier) to the first node and the second node, respectively. The node 400A (or root node) is coupled to a port (in first node and in the second node) that is assigned the parent port identifier. Therefore, the local clock of node 400A (or root node) serves as the master clock for synchronizing the local clocks of the other nodes, reducing jitter in the cycle counters of the nodes When the cycle counters are updated with the value of the cycle counter 430A of the node 400A (or root node).

Figure 8:
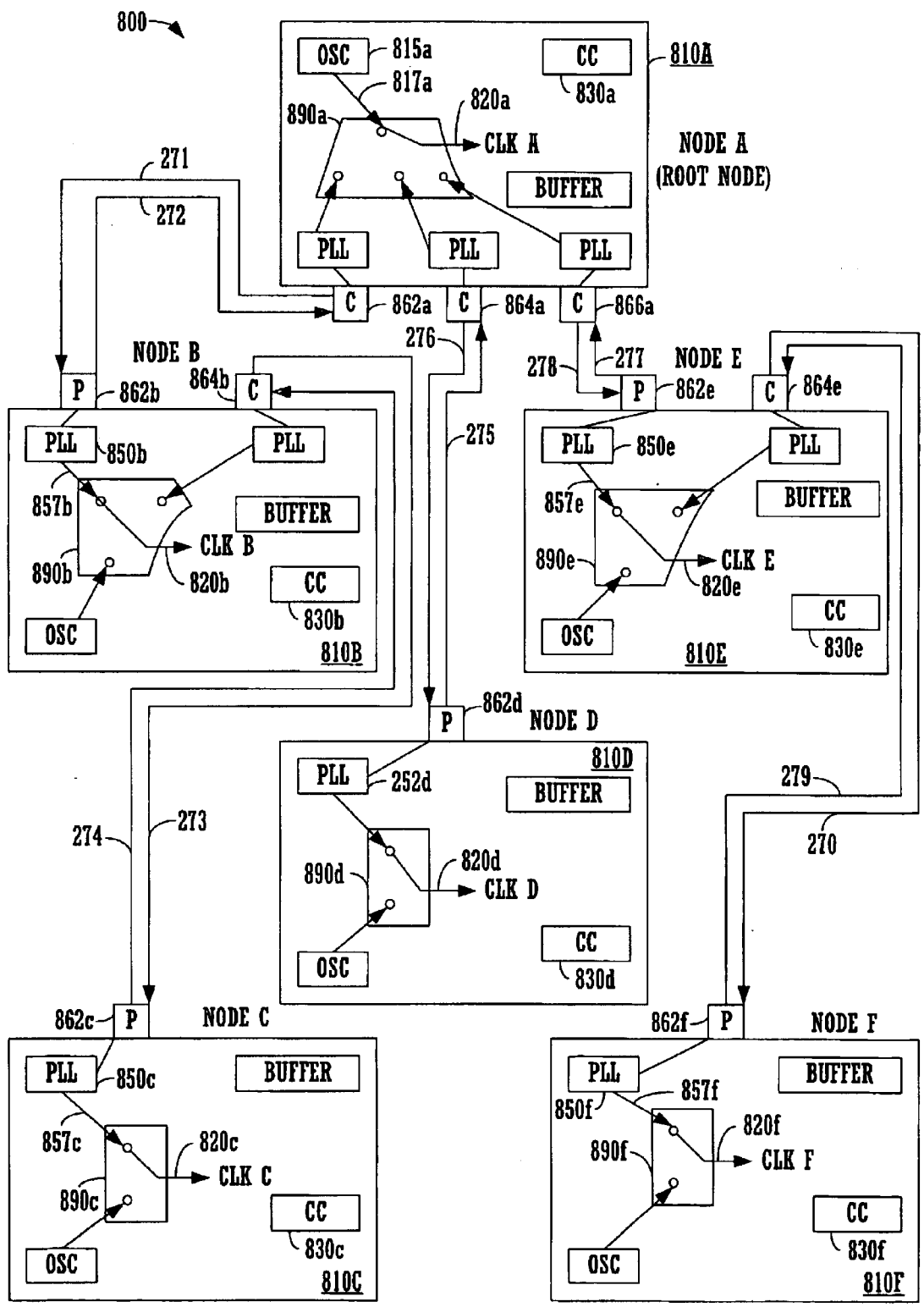
FIG. 8 illustrates a 1394b data bus system according to an embodiment of the present invention, showing a clocking scheme according to the present invention.

FIG. 8 illustrates a 1394b data bus system 800 according to an embodiment of the present invention, showing a clocking scheme according to the present invention. The 1394b data bus system includes node A 810A, node B 810B, node C 810C, node D 810D, node E 810E, and node F 810F. Each node has a respective local clock CLK A–CLK F. Each local clock CLK A–CLK F is implemented in the physical layer of the 1394b specification. Moreover, node A 810A is designated the root node 810A. Each node has a respective clock source selection circuit 890A–890F. In an embodiment of the present invention, the local clocks CLK B–CLK F are synchronized to the master clock, whereas the master clock is the local clock CLK A of the root node 810A.

In the root node 810A, the ports 862A, 864A, and 866A are assigned the child port identifier (illustrated by "C"). Moreover, the clock source selection circuit 890A couples the output terminal 817A of the local clock generator 815A to the output terminal 820A of the clock source selection circuit 890A. Thus, the local clock generator 815A serves as the clock source for the local clock CLK A of the root node. The root node 810A transmits its local clock CLK A (the master clock) via data connection 271 to node B 810B. The root node 810A transmits its local clock CLK A (the master clock) via data connection 276 to node D 810D. The root node 810A transmits its local clock CLK A (the master clock) via data connection 278 to node E 810E.

In the node B 810B, the port 862B is assigned the parent port identifier (illustrated by "P") while the port 864B is assigned the child port identifier (illustrated by "C"). The clock source selection circuit 890B couples the output terminal 857B of the clock recovery circuit 850B (which is coupled to the parent port 862B) to the output terminal 820B of the clock source selection circuit 890B, whereas the clock recovery circuit 850B recovers the local clock CLK A (the master clock) of the root node 810A. Thus, the recovered local clock CLK A (the master clock) of the root node 810A serves as the clock source for the local clock CLK B of the node B 810B, synchronizing the local clock CLK B to the master clock CLK A. The node B 810B transmits its local clock CLK B via data connection 273 to node C 810C.

In the node C 810C, the port 862C is assigned the parent port identifier (illustrated by "P"). The clock source selection circuit 890C couples the output terminal 857C of the clock recovery circuit 850C (which is coupled to the parent port 862C) to the output terminal 820C of the clock source selection circuit 890C, whereas the clock recovery circuit 850C recovers the local clock CLK B of node B 810A, whereas the local clock B is synchronized to the master clock CLK A. Thus, the recovered local clock CLK B of node B 810B serves as the clock source for the local clock CLK C of node C 810B, synchronizing the local clock CLK C to the master clock CLK A.

In the node D 810D, the port 862D is assigned the parent port identifier (illustrated by "P"). The clock source selection circuit 890D couples the output terminal 857D of the clock recovery circuit 850D (which is coupled to the parent port 862D) to the output terminal 820D of the clock source selection circuit 890D, whereas the clock recovery circuit 850D recovers the local clock CLK A (the master clock) of the root node 810A. Thus, the recovered local clock CLK A (the master clock) of the root node 810A serves as the clock source for the local clock CLK D of the node D 810D, synchronizing the local clock CLK D to the master clock CLK A.

In the node E 810E, the port 862E is assigned the parent port identifier (illustrated by "P") while the port 864E is assigned the child port identifier (illustrated by "C"). The clock source selection circuit 890E couples the output terminal 857E of the clock recovery circuit 850E (which is coupled to the parent port 862E) to the output terminal 820E of the clock source selection circuit 890E, whereas the clock recovery circuit 850E recovers the local clock CLK A (the master clock) of the root node 810A. Thus, the recovered local clock CLK A (the master clock) of the root node 810A serves as the clock source for the local clock CLK E of the node E 810E, synchronizing the local clock CLK E to the master clock CLK A. The node E 810E transmits its local clock CLK E via data connection 270 to node F 810F.

In the node F 810F, the port 862F is assigned the parent port identifier (illustrated by "P"). The clock source selection circuit 890F couples the output terminal 857F of the clock recovery circuit 850F (which is coupled to the parent port 862F) to the output terminal 820F of the clock source selection circuit 890F, whereas the clock recovery circuit 850F recovers the local clock CLK E of node E 810E, whereas the local clock E is synchronized to the master clock CLK A. Thus, the recovered local clock CLK E of node E 810E serves as the clock source for the local clock CLK F of node F 810F, synchronizing the local clock CLK F to the master clock CLK A.

In sum, the local clock CLK A of the root node serves as the master clock for synchronizing the local clocks CLK B–CLK F of the other nodes 810B–810F, reducing jitter in the cycle counters 830B–830F of the nodes 810B–810F when the cycle counters 830B–830F are updated with the value of the cycle counter 830A of the root node 810A.

Figure 8B:
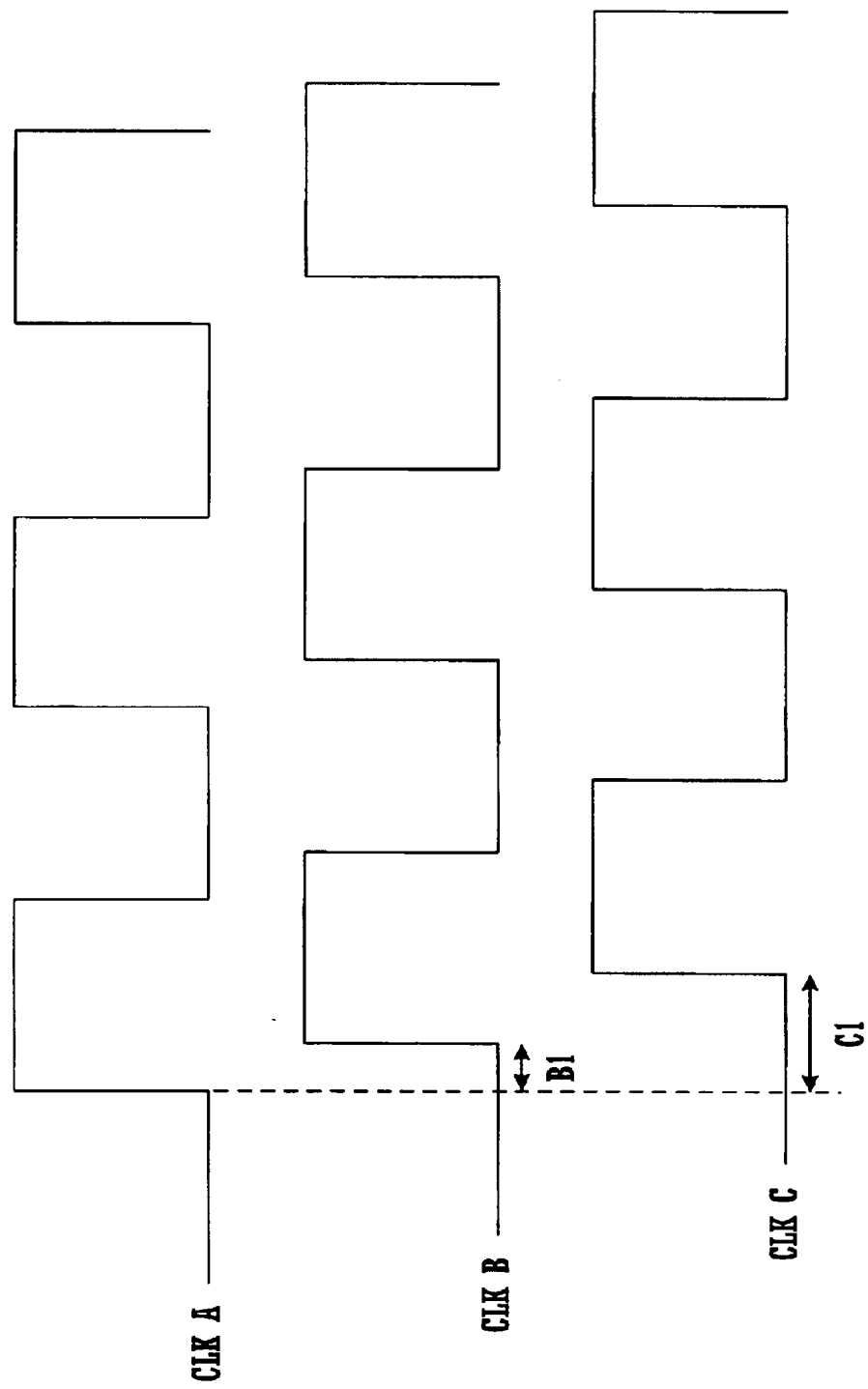
FIG. 8B illustrates the relationship between the local clocks of the nodes of the 1394b data bus system of FIG. 8, showing a fixed offset between the local clocks.

FIG. 8B illustrates the relationship between the local clocks of the nodes of the 1394b data bus system of FIG. 8, showing a fixed offset between the local clocks. CLK A (the master clock) is the local clock of the root node 810A, whereas the cycle counter 830A of the root node 810A is incremented by CLK A. As described above, the root node 810A synchronizes the cycle counters 830B–830F of the other nodes 810B–810F to its cycle counter 830A by transmitting a cycle start packet that has the value of the cycle counter 830A of the root node 810A. CLK B is the local clock of node B 810B. CLK C is the local clock of node C 810C. The discussion with respect to FIG. 8B is also applicable to local clocks CLK D–CLK F.

FIG. 8B illustrates that the CLK B is synchronized to CLK A to avoid the phase drift shown in FIGS. 3A–3D, whereas b1 is a fixed offset associated with the phase of CLK B with respect to CLK A. Moreover, FIG. 8B illustrates that the CLK C is synchronized to CLK A to avoid the phase drift shown in FIGS. 3A–3D, whereas is a fixed offset associated with the phase of CLK C with respect to CLK A. Thus, the clocking scheme of the present invention produces local clocks that are synchronized to the master clock CLK A, substantially reducing the clock phase drifts that cause the propagation time of the cycle start packet to fluctuate and that cause the cycle counters 830B–830F to drift with respect to the cycle counter 830A of the root node 810A prior to receiving the cycle start packet. More importantly, the clocking scheme of the present invention substantially reduces the jitter in the cycle counters 830B–830F of nodes 810B–8110F when the cycle counters 830B–830F are updated with the value of the cycle counter 830A of the root node 810A.

Figure 8C:
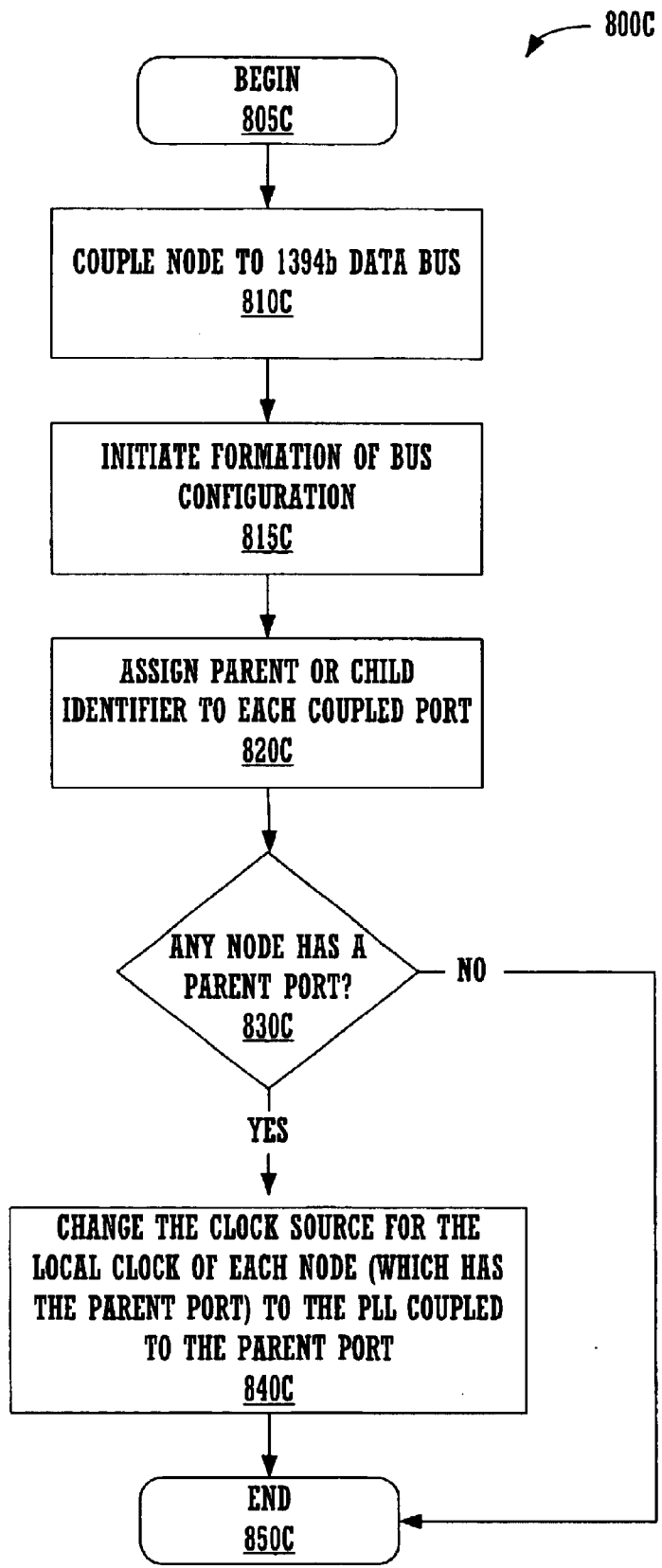
FIG. 8C illustrates a flow diagram, showing a method of synchronizing local clocks in a data bus system in accordance with an embodiment of the present invention.

FIG. 8C illustrates a flow diagram 800C, showing a method of synchronizing local clocks in a data bus system 800 (FIG. 8) in accordance with an embodiment of the present invention. In an embodiment, the data bus system is a 1394b data bus system having a plurality of nodes (each node compliant with the 1394b specification). Each node is a device (e.g., computer system, digital camera, digital VCR, TV settop box, digital camcorder, storage device, digital audio device, etc.) which is compliant with the 1394b specification.

At step 805C, the method of synchronizing local clocks in a data bus system 800 in accordance with an embodiment begins.

At step 810C, a node (e.g., node 400A of FIG. 4B) is coupled to the 1394b data bus system 800.

At step 815C, formation of a data bus configuration for the 1394b data bus system 800 is initiated. It should be understood that formation of the data bus configuration can be initiated by the occurrence of any event or condition specified in the 1394b specification. Additionally, one of the nodes is designated as the root node. Initially, the local clocks are generated by the respective local clock generators of each node.

At step 820C, each node assigns a parent port identifier or a child port identifier to each port that is coupled to another port.

At step 830C, it is determined whether any node has a port that is assigned the parent port identifier. At step 850C, the method according to an embodiment of the present invention ends if a port has not been assigned the parent port identifier.

Otherwise, at step 840C, each node (having a port that is assigned the parent port identifier) changes the clock source for its local clock from the local clock generator to the clock recovery circuit coupled to the port that is assigned the parent port identifier. The clock recovery circuit recovers the local clock transmitted by a transmitting node coupled to the port that is assigned the parent port identifier. In an embodiment, the clock recovery circuit comprises a phase locked loop (PLL). In an embodiment, each node includes a clock source selection circuit for facilitating changing the clock source for the local clock.

Figure 9A:
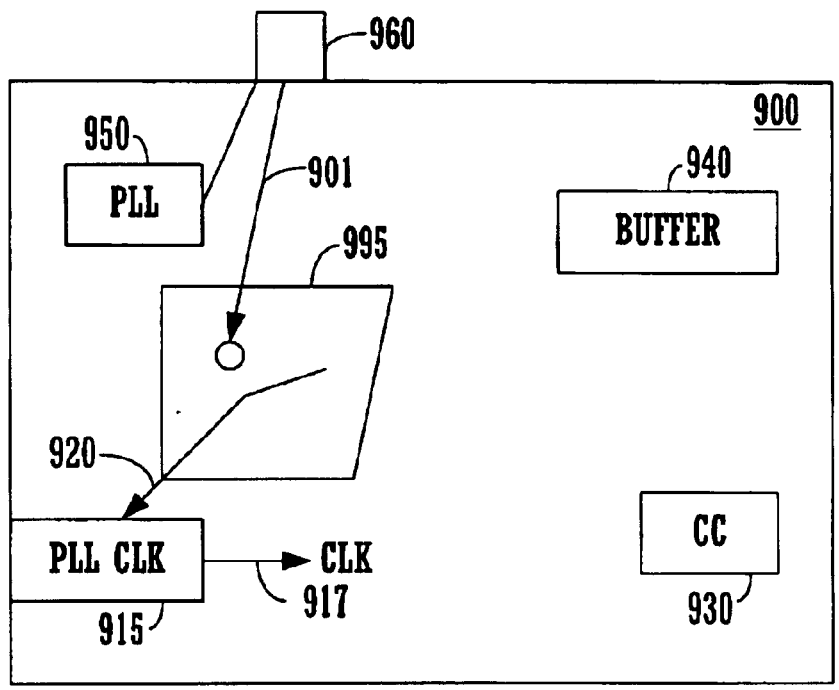
FIG. 9A illustrates a node according to a second embodiment of the present invention, showing a local clock and one port.

FIG. 9A illustrates a node 900 according to a second embodiment of the present invention, showing a local clock CLK and one port 960. In a second embodiment, the node 900 is compliant with the 1394b specification. A plurality of nodes (each node configured similarly to node 900) are coupled together to form a 1394b data bus system according to a second embodiment of the present invention. As discussed above, the 1394 Standard (including the 1394-1995 specification, the 1394a specification, and the 1394b specification) is comprised of a transaction layer, a link layer, a physical layer, and a serial bus management layer, whereas each protocol layer is implemented as circuitry, software, or both. The local clock CLK is implemented in the physical layer of the 1394b specification.

In a second embodiment, the node 900 includes a port 960, and a clock recovery circuit 950 coupled to the port 460. In addition, the node 900 includes a buffer 940 and a cycle counter 930. The port 960 facilitates coupling the node 900 to another port of another node. It should be understood that the node 900 can have more than one port, whereas each port is coupled to a separate clock recovery circuit. The clock recovery circuit 950 recovers a local clock that is transmitted by a transmitting node that is coupled to the port 960. The transmitting node encodes data packets together with its local clock using a 8B10B coding prior to transmitting the data packets and its local clock. In a second embodiment, the clock recovery circuit 950 comprises a phase locked loop 950. It should be understood that the clock recovery circuit 950 can be implemented in any other manner.

The cycle counter 930 facilitates coordinating time dependent data (e.g., digital video data, digital audio data, etc.), as described above. In addition, the buffer 940 enables storing data which is to be transmitted to another node or which has been received from another node.

In a second embodiment, the node 900 has a multiple mode clock recovery circuit 915 and a mode selection circuit 995. The multiple mode clock recovery circuit 915 can operate in a locked mode and in a unlocked mode. The multiple mode clock recovery circuit 915 has an output terminal 917, whereas the output terminal 917 provides the local clock CLK for the node 900. The multiple mode clock recovery circuit 915 is coupled to an output terminal 920 of the mode selection circuit 995. When operating in the unlocked mode (i.e., when the output terminal 920 of the mode selection circuit 995 does not provide an input signal) as shown in FIG. 9A, the multiple mode clock recovery circuit 915 generates a signal which can operate as the clock source for the local clock CLK of the node 900. In other words, the multiple mode clock recovery circuit 915 is free running. When operating in the locked mode (i.e., when the output terminal 920 of the mode selection circuit 995 provides an input signal corresponding to the local clock transmitted by another node coupled to port 960), the multiple mode clock recovery circuit 915 recovers the local clock transmitted by another node coupled to port 960. The recovered local clock is outputted via the output terminal 917 and can serve as the clock source for the local clock CLK of the node 900. The cycle counter 930 is incremented by the local clock CLK.

The mode selection circuit 995 is coupled to an output terminal 901 of the port 960. In a second embodiment, the node 900 selectively couples the output terminal 920 of the mode selection circuit 995 to the output terminal 901 of the port 960 (i.e., an input signal is provided to the multiple mode clock recovery circuit 915) or to an unlocked mode position (i.e., an input signal is not provided to the multiple mode clock recovery circuit 915) in order to enable operating the multiple mode clock recovery circuit 915 in either the unlocked mode or the locked mode. This facilitates synchronization of the local clock CLK to a master clock so that to reduce jitter in the cycle counter 930 of the node 900 and in the cycle counters of the other nodes when the cycle counters are updated with the value of the cycle counter of the root node.

In a second embodiment, the multiple mode clock recovery circuit 915 comprises a phase locked loop 915. It should be understood that the multiple mode clock recovery circuit 915 can be implemented in any other manner.

In a second embodiment, the mode selection circuit 995 comprises a switch 995. It should be understood that the mode selection circuit 995 can be implemented in any other manner. It should be understood that the clock source for the local clock CLK can be changed using an implementation other than the mode selection circuit 995.

Initially, the node 900 operates with the local clock CLK coupled to the output terminal 917 of the multiple mode clock recovery circuit 915 operating in the unlocked mode. When the node 900 is coupled to a 1394b data bus system, the node 900 participates in establishing a data bus configuration for the 1394b data bus system. One of the nodes in the 1394b data bus system is designated the root node. When forming the data bus configuration, the node 900 as well as the other nodes in the 1394b data bus system assign either a first identifier or a second identifier to their respective ports that are coupled to another port. In a second embodiment, the first identifier is a parent port and the second identifier is a child port. The parent port identifier is assigned to a port to indicate that a node which is closer to the root node is coupled to that port. Moreover, a child port identifier is assigned to a port to indicate that a node which is farther away from the root node is coupled to that port.

In a second embodiment of the present invention, if the node 900 assigns a parent port identifier to its port 960, the node 900 changes the clock source for its local clock CLK via the mode selection circuit 995, by placing the multiple mode clock recovery circuit 915 in the locked mode. In particular, the node 900 couples the output terminal 901 of the port 960 (via the mode selection circuit 995) to the multiple mode clock recovery circuit 915, whereas the multiple mode clock recovery circuit 915 recovers the local clock of the transmitting node coupled to the port 960 of the node 900. Hence, the recovered local clock operates as the clock source for the local clock CLK of the node 900, enabling synchronization of the local clock CLK of the node 900 and of the local clocks of the other nodes. As will be described below, the root node assigns a child port identifier to its port or ports, maintaining its multiple mode clock recovery circuit 915 operating in the unlocked mode. The root node is coupled to at least one parent port of another node and transmits its local clock via its child port to the parent port of another node. Therefore, the local clock of the root node serves as the master clock for synchronizing the local clocks of the other nodes, reducing jitter in the cycle counters of the nodes when the cycle counters are updated with the value of the cycle counter of the root node.

Figure 9B:
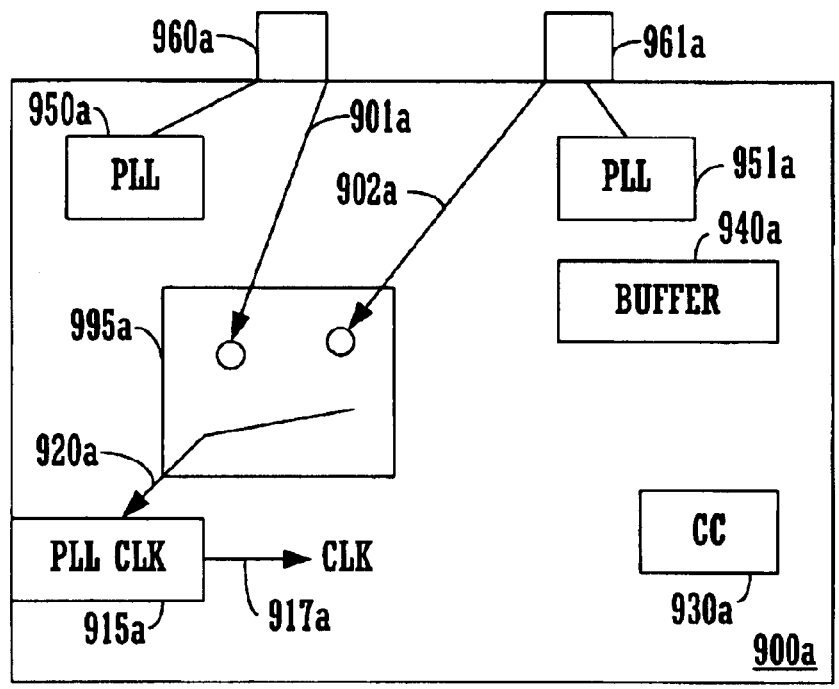
FIG. 9B illustrates a node according to a second embodiment of the present invention, showing a local clock and multiple ports.

FIG. 9B illustrates a node 900A according to a second embodiment of the present invention, showing a local clock CLK and multiple ports 960A and 961A. The node 900A includes a first port 960A, a second port 961A, a buffer 940A, a cycle counter 930A, a first clock recovery circuit 950A coupled to the first port 960A, a second clock recovery circuit 951A coupled to the second port 961A, and a multiple mode clock recovery circuit 915A. The description of these elements with respect to node 900 in FIG. 9A is applicable to node 900A in FIG. 9B. In addition, node 900A includes a mode selection circuit 995A. The mode selection circuit 995A is coupled to an output terminal 901A of the first port 960A and an output terminal 902A of the second port 961A. The mode selection circuit 995A has an output terminal 920A. The node 900A places the multiple mode clock recovery circuit 915A in either the unlocked mode or the locked mode (via the mode selection circuit 995A), as described above. In a second embodiment, the node 900A selectively couples the output terminal 920A of the mode selection circuit 995A to the output terminal 901A of the first port 960A (i.e., an input signal is provided to the multiple mode clock recovery circuit 915A), to the output terminal 902A of the second port 961A (i.e., an input signal is provided to the multiple mode clock recovery circuit 915A), or to the unlocked mode position as shown in FIG. 9B (i.e., an input signal is not provided to the multiple mode clock recovery circuit 915A).

In a second embodiment, the node can selectively couple the output terminal of the mode selection circuit to any of the ports of the node and to the unlocked mode position (as shown in FIG. 9B). The discussion of the operation and synchronization of the local clock with respect to node 900 of FIG. 9A is applicable to node 900A of FIG. 9B.

Figure 9C:
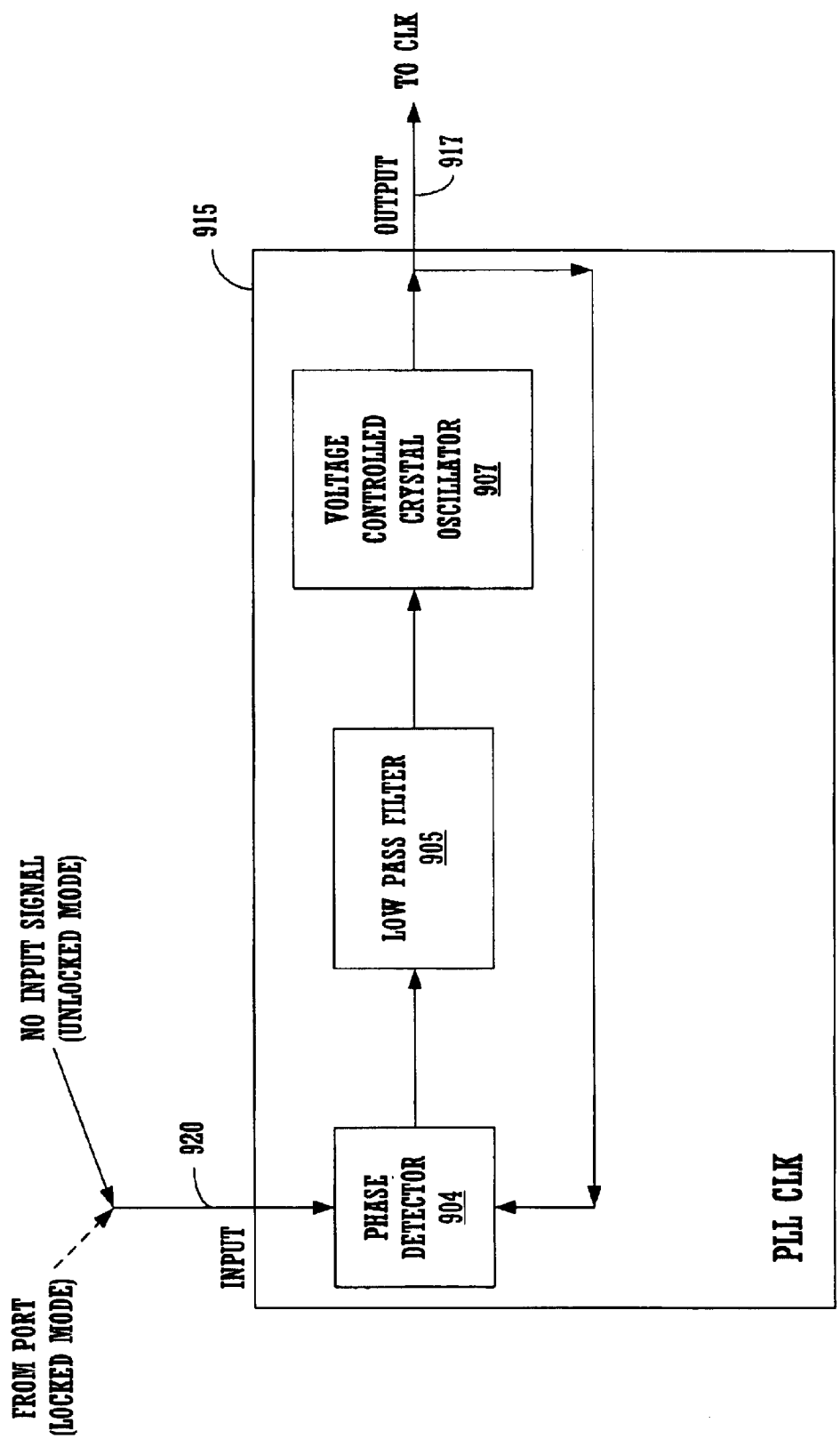
FIG. 9C illustrates a phase locked loop according to a second embodiment of the present invention.

FIG. 9C illustrates a phase locked loop 915 for providing the local clock according to a second embodiment of the present invention. The multiple mode clock recovery circuit 915 of FIG. 9A and the multiple mode clock recovery circuit 915A of FIG. 9B can be configured as illustrated in FIG. 9C. In a second embodiment, the phase locked loop 915 includes an input terminal 920, a phase detector 904 coupled to the input terminal 920, a low pass filter 905 coupled to the phase detector 904, a voltage controlled crystal oscillator 907 coupled to the low pass filter 905 and to the phase detector 904, and an output terminal 917 coupled to the voltage controlled crystal oscillator 907. When the phase locked loop 915 is operated in the unlocked mode, the input terminal 920 does not receive an input signal via the mode selection circuit (not shown). Thus, the phase locked loop 915 is free running such that the voltage controlled crystal oscillator 907 generates a stable signal capable of serving as the local clock for the node. When the phase locked loop 915 is operated in the locked mode, the input terminal is coupled to a port via the mode selection circuit (not shown). Thus, the phase locked loop 915 recovers a transmitted local clock.

When operating in the unlocked mode, the phase locked loop 915 generates a signal (e.g., the signal generated by the voltage controlled crystal oscillator 907) which can operate as the clock source for the local clock CLK of the node. When operating in the locked mode, the phase locked loop 915 recovers the local clock transmitted by another node coupled to the port that is assigned the parent port identifier. The recovered local clock is outputted via the output terminal 917 and can serve as the clock source for the local clock CLK of the node. It should be understood that the phase locked loop 915 can be implemented in any other manner and can have other components.

Figure 10A:
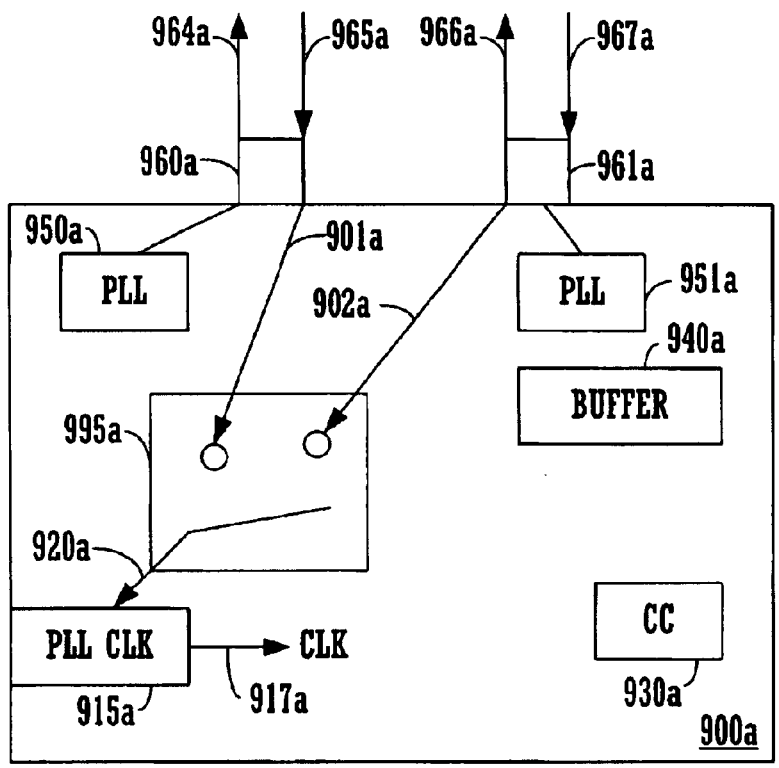
FIG. 10A illustrates a node according to a second embodiment of the present invention, showing a local clock before clock synchronization.

FIG. 10A illustrates a node 900A in a 1394b data bus system according to a second embodiment of the present invention, showing a local clock CLK before clock synchronization. The local clock CLK is implemented in the physical layer of the 1394b specification. The node 900A of FIG. 9B is illustrated in FIG. 10A. As illustrated in FIG. 10A, the node 900A is coupled to a first node (not shown) via port 960A and is coupled to a second node (not shown) via port 961A, whereas node 900A transmits data and its local clock CLK via data connections 964A and 966A. Node 900A receives data and the local clock of the first node via data connection 965A. Node 900A receives data and the local clock of the second node via data connection 967A. Moreover, since the node 900A has not assigned either a first identifier or a second identifier to its ports 960A and 961A, a data bus configuration for the 1394b data bus has not been established. In a second embodiment, formation of the data bus configuration is initiated upon the occurrence of any event or condition specified in the 1394b specification (e.g., adding a node to the 1394b data bus system, removing a node from the 1394b data bus system, etc.). In a second embodiment of the present invention, formation of the data bus configuration begins by performing a Bus Reset procedure as specified in the 1394b specification.

FIG. 10A illustrates the node 900A before its local clock CLK is synchronized to a master clock according to a second embodiment of the present invention, whereas the master clock is the local clock of the root node as described above. Before the local clock CLK of node 900A is synchronized to the master clock, the local clock CLK is provided by the multiple mode clock recovery circuit 915A operating in the unlocked mode.

Figure 10B:
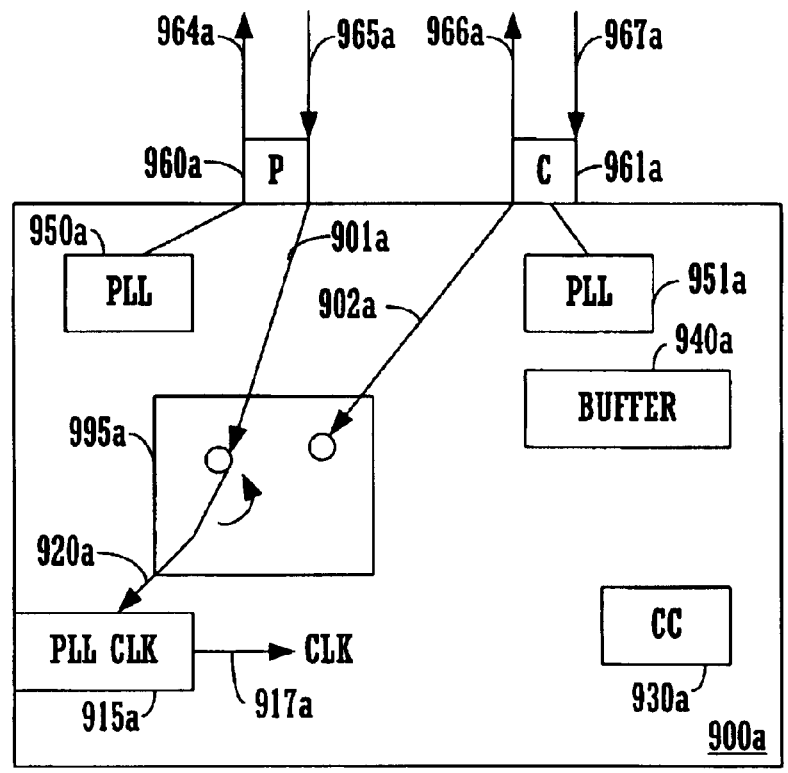
FIG. 10B illustrates a node according to a second embodiment of the present invention, showing a local clock after clock synchronization.

FIG. 10B illustrates a node 900A in a 1394b data bus system according to a second embodiment of the present invention, showing a local clock CLK after clock synchronization. The node 900A participates in establishing the data bus configuration for the 1394b data bus system. During formation of the data bus configuration for the 1394b data bus system, one of the nodes is designated as the root node as specified in the 1394b specification. Moreover, during formation of the data bus configuration for the 1394b data bus system, the node 900A assigns a parent port identifier (illustrated by "P") to port 960A to indicate that a node which is closer to the root node is coupled to that port 960A. Moreover, the node 900A assigns a child port identifier (illustrated by "C") to port 961A to indicate that a node which is farther away from the root node is coupled to that port 961A. The parent port of one node couples to the child port of another node. The other nodes in the 1394b data bus system perform a similar operation. In a second embodiment, the node 900A assigns the particular identifier to its ports 960A and 961A during a Tree Identification procedure as specified in the 1394b specification.

Since the node 900A has a port 960A that is assigned the parent port identifier, the node 900A synchronizes its local clock CLK by changing a clock source for its local clock CLK. If the node 900A does not have a port that is assigned the parent port identifier, the node 900A would continue to have the multiple mode clock recovery circuit operating in the unlocked mode serve as the clock source for its local clock CLK. In a second embodiment of the present invention, the root node is the node that does not have a port that is assigned the parent port identifier.

In order to synchronize the local clock CLK, the mode selection circuit 995A couples its output terminal 920A to the output terminal 901A of the first port (which is assigned the parent port identifier) so that to place the multiple mode clock recovery circuit 915A in the locked mode. In the locked mode, the multiple mode clock recovery circuit 915A recovers the local clock transmitted via data connection 965A by the first node coupled to the port 960A. The recovered local clock serves as the clock source for the local clock CLK of the node 900A. The node 900A utilizes the local clock CLK (which is the recovered local clock of the first node) to increment the cycle counter 930A. Moreover, the node 900A utilizes the local clock CLK (which is the recovered local clock of the first node) to synchronize the transmission of data and its local clock CLK via data connections 964A and 966A during data transfer operations supported by the 1394b data bus system, whereas the node 900A encodes the data together with its local clock CLK using a 8B10B coding prior to transmitting the data and its local clock CLK. In addition, the node 900A utilizes the local clock CLK (which is the recovered local clock of the first node) to perform any other operation requiring the use of its local clock CLK. The other nodes in the 1394b data bus system perform a similar operation. In a second embodiment, the node 900A changes a clock source for its local clock CLK during a Self Identification procedure as specified in the 1394b specification.

In the data bus configuration for the 1394b data bus system according to a second embodiment of the present invention, the root node maintains its multiple mode clock recovery circuit operating in the unlocked mode as the clock source for its local clock, transmitting its local clock via its port or ports (which are assigned the child port identifier) to at least one port (of the other nodes) that is assigned the parent port identifier. The other nodes (including node 900A) change the clock source for their local clocks such that the multiple mode clock recovery circuit operating in the locked mode serves as the clock source for the local clock of the other nodes (including node 900A). Therefore, the local clock of the root node serves as the master clock for synchronizing the local clocks of the other nodes, reducing jitter in the cycle counters of the nodes when the cycle counters are updated with the value of the cycle counter of the root node.

Figure 11A:
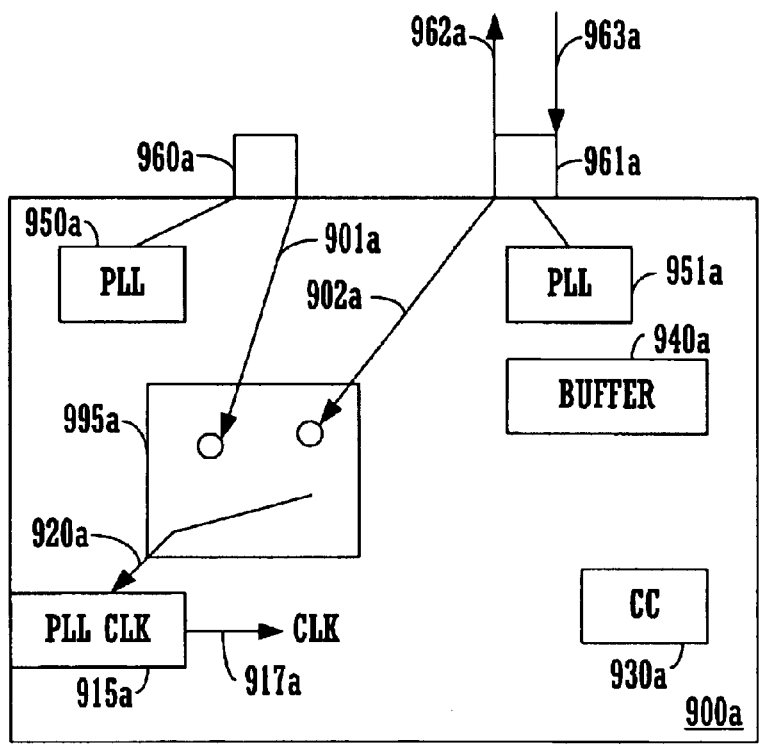
FIG. 11A illustrates a node according to a second embodiment of the present invention, showing a local clock before clock synchronization.

FIG. 11A illustrates a node 900A in a 1394b data bus system according to a second embodiment of the present invention, showing a local clock CLK before clock synchronization. The local clock CLK is implemented in the physical layer of the 1394b specification. The node 900A of FIG. 9B is illustrated in FIG. 11A. As illustrated in FIG. 11A, the node 900A is coupled to a first node (not shown) via port 961A, whereas node 900A transmits data and its local clock CLK via data connection 962A. Node 900A receives data and the local clock of the first node via data connection 963A. Moreover, since the node 900A has not assigned either a first identifier or a second identifier to its port 961A, a data bus configuration for the 1394b data bus has not been established. In a second embodiment, formation of the data bus configuration is initiated upon the occurrence of any event or condition specified in the 1394b specification (e.g., adding a node to the 1394b data bus system, removing a node from the 1394b data bus system, etc.). In a second embodiment of the present invention, formation of the data bus configuration begins by performing a Bus Reset procedure as specified in the 1394b specification.

FIG. 11A illustrates the node 900A before its local clock CLK is synchronized to a master clock according to a second embodiment of the present invention, whereas the master clock is the local clock of the root node as described above. Before the local clock CLK of node 900A is synchronized to the master clock, the local clock CLK is provided by the multiple mode clock recovery circuit 995A operating in the unlocked mode.

Figure 11B:
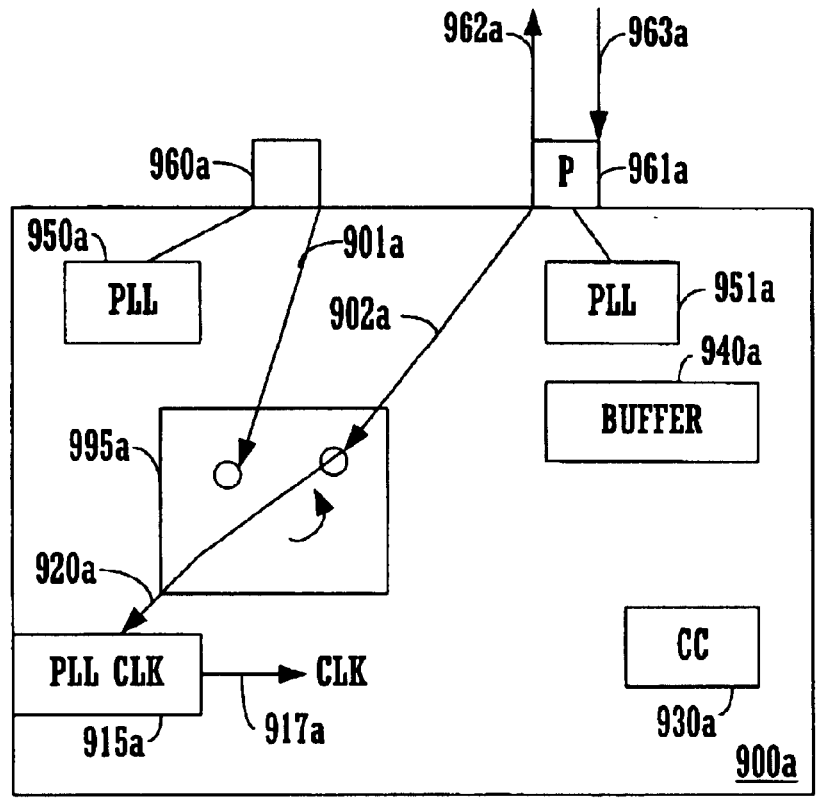
FIG. 11B illustrates a node according to a second embodiment of the present invention, showing a local clock after clock synchronization.

FIG. 11B illustrates a node 900A in a 1394b data bus system according to a second embodiment of the present invention, showing a local clock CLK after clock synchronization. The node 900A participates in establishing the data bus configuration for the 1394b data bus system. During formation of the data bus configuration for the 1394b data bus system, one of the nodes is designated as the root node as specified in the 1394b specification. Moreover, during formation of the data bus configuration for the 1394b data bus system, the node 900A assigns a parent port identifier (illustrated by "P") to port 961A to indicate that a node which is closer to the root node is coupled to that port. The parent port of one node couples to the child port of another node. Since port 960A is not coupled to another node, node 900A does not assign a particular identifier to port 960A. The other nodes in the 1394b data bus system perform a similar operation. In a second embodiment, the node 900A assigns the particular identifier to its port 961A during a Tree Identification procedure as specified in the 1394b specification.

Since the node 900A has a port 961A that is assigned the parent port identifier, the node 900A synchronizes its local clock CLK by changing a clock source for its local clock CLK. In order to synchronize the local clock CLK, the mode selection circuit 995A couples its output terminal 920A to the output terminal 902A of the second port 961A (which is assigned the parent port identifier) so that to place the multiple mode clock recovery circuit 915A in the locked mode. In the locked mode, the multiple mode clock recovery circuit 915A recovers the local clock transmitted via data connection 963A by the first node coupled to the port 961A. The recovered local clock serves as the clock source for the local clock CLK of the node 900A. The node 900A utilizes the local clock CLK (which is the recovered local clock of the first node) to increment the cycle counter 930A. Moreover, the node 900A utilizes the local clock CLK (which is the recovered local clock of the first node) to synchronize the transmission of data and its local clock CLK via data connection 962A during data transfer operations supported by the 1394b data bus system, whereas the node 900A encodes the data together with its local clock CLK using a 8B10B coding prior to transmitting the data and its local clock CLK. In addition, the node 900A utilizes the local clock CLK (which is the recovered local clock of the first node) to perform any other operation requiring the use of its local clock CLK. The other nodes in the 1394b data bus system perform a similar operation. In a second embodiment, the node 900A changes a clock source for its local clock CLK during a Self Identification procedure as specified in the 1394b specification.

Figure 12A:
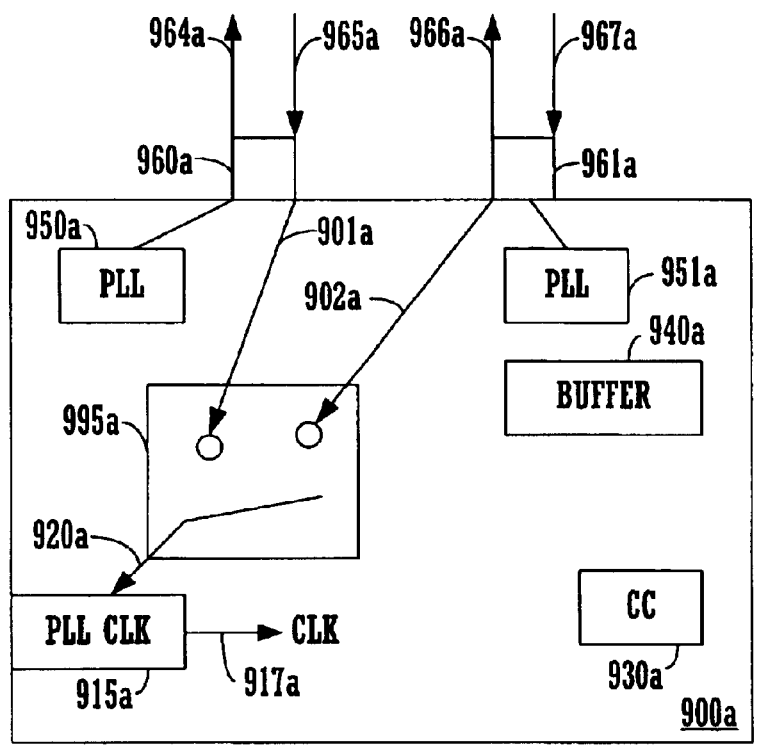
FIG. 12A illustrates a node according to a second embodiment of the present invention, showing a local clock before clock synchronization.

FIG. 12A illustrates a node 900A in a 1394b data bus system according to a second embodiment of the present invention, showing a local clock CLK before clock synchronization. The local clock CLK is implemented in the physical layer of the 1394b specification. The node 900A of FIG. 9B is illustrated in FIG. 12A. As illustrated in FIG. 12A, the node 900A is coupled to a first node (not shown) via port 960A and is coupled to a second node (not shown) via port 961A, whereas node 900A transmits data and its local clock CLK via data connections 964A and 966A. Node 900A receives data and the local clock of the first node via data connection 965A. Node 900A receives data and the local clock of the second node via data connection 967A. Moreover, since the node 900A has not assigned either a first identifier or a second identifier to its ports 960A and 961A, a data bus configuration for the 1394b data bus has not been established. In a second embodiment, formation of the data bus configuration is initiated upon the occurrence of any event or condition specified in the 1394b specification (e.g., adding a node to the 1394b data bus system, removing a node from the 1394b data bus system, etc.). In a second embodiment of the present invention, formation of the data bus configuration begins by performing a Bus Reset procedure as specified in the 1394b specification.

FIG. 12A illustrates the node 900A before its local clock CLK is synchronized to a master clock according to a second embodiment of the present invention, whereas the master clock is the local clock of the root node as described above. Before the local clock CLK of node 900A is synchronized to the master clock, the local clock CLK is provided by the multiple mode clock recovery circuit 915A operating in the unlocked mode.

Figure 12B:
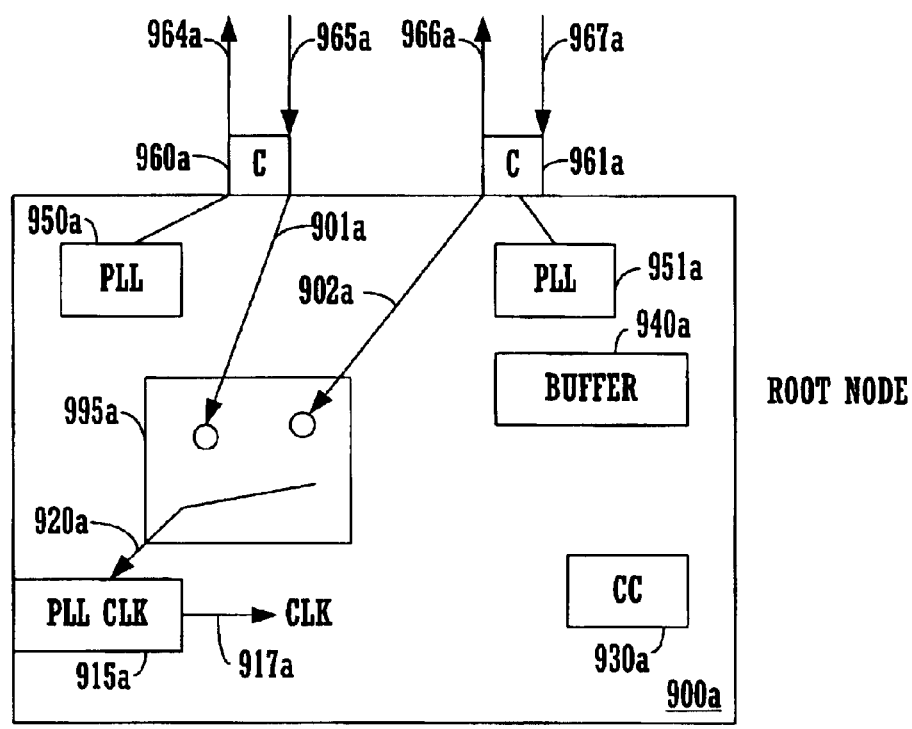
FIG. 12B illustrates a root node according to a second embodiment of the present invention, showing a local clock after clock synchronization.

FIG. 12B illustrates a node 900A in a 1394b data bus system according to a second embodiment of the present invention, showing a local clock CLK after clock synchronization and showing the node 900A designated as a root node. The node 900A participates in establishing the data bus configuration for the 1394b data bus system. During formation of the data bus configuration for the 1394b data bus system, the node 900A is designated as the root node as specified in the 1394b specification. Moreover, during formation of the data bus configuration for the 1394b data bus system, the node 900A (or root node) assigns a child port identifier (illustrated by "C") to ports 960A and 961A to indicate that a node which is farther away from the root node is coupled to ports 960A and 961A. The parent port of one node couples to the child port of another node. In a second embodiment, the node 900A assigns the particular identifier to its ports 960A and 961A during a Tree Identification procedure as specified in the 1394b specification.

Since the node 900A does not have a port that is assigned the parent port identifier, the node 900A (or root node) continues to have its multiple mode clock recovery circuit 915A operating in the unlocked mode serve as the clock source for its local clock CLK. Moreover, node 900A (or root node) transmits its local clock CLK via its ports 960A and 961A (which are assigned the child port identifier) to the first node and the second node, respectively. The node 900A (or root node) is coupled to a port (in first node and in the second node) that is assigned the parent port identifier. Therefore, the local clock of node 900A (or root node) serves as the master clock for synchronizing the local clocks of the other nodes, reducing jitter in the cycle counters of the nodes when the cycle counters are updated with the value of the cycle counter 930A of the node 900A (or root node).

Figure 13:
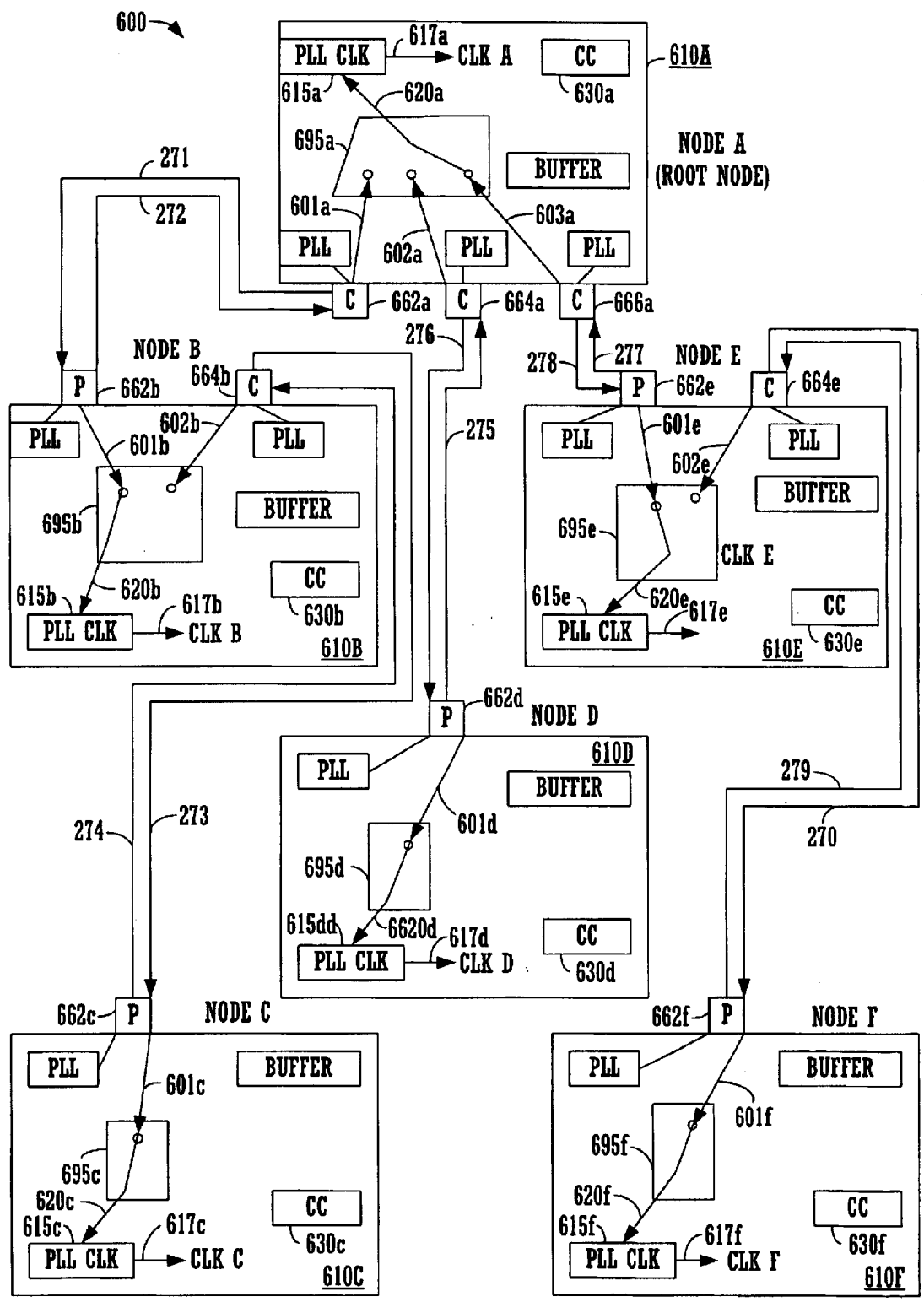
FIG. 13 illustrates a 1394b data bus system according to a second embodiment of the present invention, showing a clocking scheme according to the present invention.

FIG. 13 illustrates a 1394b data bus system 600 according to a second embodiment of the present invention, showing a clocking scheme according to the present invention. The 1394b data bus system includes node A 610A, node B 610B, node C 610C, node D 610D, node E 610E, and node F 610F. Each node has a respective local clock CLK A–CLK F. Each local clock CLK A–CLK F is implemented in the physical layer of the 1394b specification. Moreover, node A 610A is designated the root node 610A. Each node has a respective mode selection circuit 695A–695F. In a second embodiment of the present invention, the local clocks CLK B–CLK F are synchronized to the master clock, whereas the master clock is the local clock CLK A of the root node 610A.

In the root node 610A, the ports 662A, 664A, and 666A are assigned the child port identifier (illustrated by "C"). Moreover, the mode selection circuit 695A maintains the multiple mode clock recovery circuit 615A operating in the unlocked mode, whereas the multiple mode clock recovery circuit 615A operating in the unlocked mode functions as the clock source for the local clock CLK A of the root node 610A. The root node 610A transmits its local clock CLK A (the master clock) via data connection 271 to node B 610B. The root node 610A transmits its local clock CLK A (the master clock) via data connection 276 to node D 610D. The root node 610A transmits its local clock CLK A (the master clock) via data connection 278 to node E 610E.

In the node B 610B, the port 662B is assigned the parent port identifier (illustrated by "P") while the port 664B is assigned the child port identifier (illustrated by "C"). The mode selection circuit 695B couples the output terminal 601 B of the port 662B (which is assigned the parent port identifier) to its output terminal 620B so that to operate the multiple mode clock recovery circuit 615B in the locked mode, whereas the multiple mode clock recovery circuit 615B operating in the locked mode recovers the local clock CLK A (the master clock) of the root node 610A. Thus, the recovered local clock CLK A (the master clock) of the root node 610A serves as the clock source for the local clock CLK B of the node B 610B, synchronizing the local clock CLK B to the master clock CLK A. The node B 610B transmits its local clock CLK B via data connection 273 to node C 610C.

In the node C 610C, the port 662C is assigned the parent port identifier (illustrated by "P"). The mode selection circuit 695C couples the output terminal 601C of the port 662B (which is assigned the parent port identifier) to its output terminal 620C so that to operate the multiple mode clock recovery circuit 615C in the locked mode, whereas the multiple mode clock recovery circuit 615C operating in the locked mode recovers the local clock CLK B of node B 610B, whereas the local clock CLK B is synchronized to the master clock CLK A. Thus, the recovered local clock CLK B of node B 610B serves as the clock source for the local clock CLK C of node C 610C, synchronizing the local clock CLK C to the master clock CLK A.

In the node D 610D, the port 662D is assigned the parent port identifier (illustrated by "P"). The mode selection circuit 695D couples the output terminal 601D of the port 662D (which is assigned the parent port identifier) to its output terminal 620D so that to operate the multiple mode clock recovery circuit 615D in the locked mode, whereas the multiple mode clock recovery circuit 615D operating in the locked mode recovers the local clock CLK A (the master clock) of the root node 610A. Thus, the recovered local clock CLK A (the master clock) of the root node 610A serves as the clock source for the local clock CLK D of the node D 610D, synchronizing the local clock CLK D to the master clock CLK A.

In the node E 610E, the port 662E is assigned the parent port identifier (illustrated by "P") while the port 664E is assigned the child port identifier (illustrated by "C"). The mode selection circuit 695E couples the output terminal of the port 662E (which is assigned the parent port identifier) to its output terminal 620E so that to operate the multiple mode clock recovery circuit 615E in the locked mode, whereas the multiple mode clock recovery circuit 615E operating in the locked mode recovers the local clock CLK A (the master clock) of the root node 610A. Thus, the recovered local clock CLK A (the master clock) of the root node 610A serves as the clock source for the local clock CLK E of the node E 610E, synchronizing the local clock CLK E to the master clock CLK A. The node E 610E transmits its local clock CLK E via data connection 270 to node F 610F.

In the node F 610F, the port 662F is assigned the parent port identifier (illustrated by "P"). The mode selection circuit 695F couples the output terminal of the port 662F (which is assigned the parent port identifier) to its output terminal 620F so that to operate the multiple mode clock recovery circuit 615F in the locked mode, whereas the multiple mode clock recovery circuit 615F operating in the locked mode recovers the local clock CLK E of node E 610E, whereas the local clock CLK E is synchronized to the master clock CLK A. Thus, the recovered local clock CLK E of node E 610E serves as the clock source for the local clock CLK F of node F 610F, synchronizing the local clock CLK F to the master clock CLK A.

In sum, the local clock CLK A of the root node serves as the master clock for synchronizing the local clocks CLK B–CLK F of the other nodes 610B–610F, reducing jitter in the cycle counters 630B–630F of the nodes 610B–610F when the cycle counters 630B–630F are updated with the value of the cycle counter 630A of the root node 610A.

The discussion of FIG. 8B is applicable to the local clocks of the nodes of the 1394b data bus system of FIG. 13. In particular, the local clocks CLK B–CLK F have a fixed offset with respect to CLK A (the master clock). Moreover, the clocking scheme of the second embodiment of the present invention can prevent discontinuities in the local clocks when changing the clock source for the local clock in order to synchronize the local clocks to the master clock.

Figure 13B:
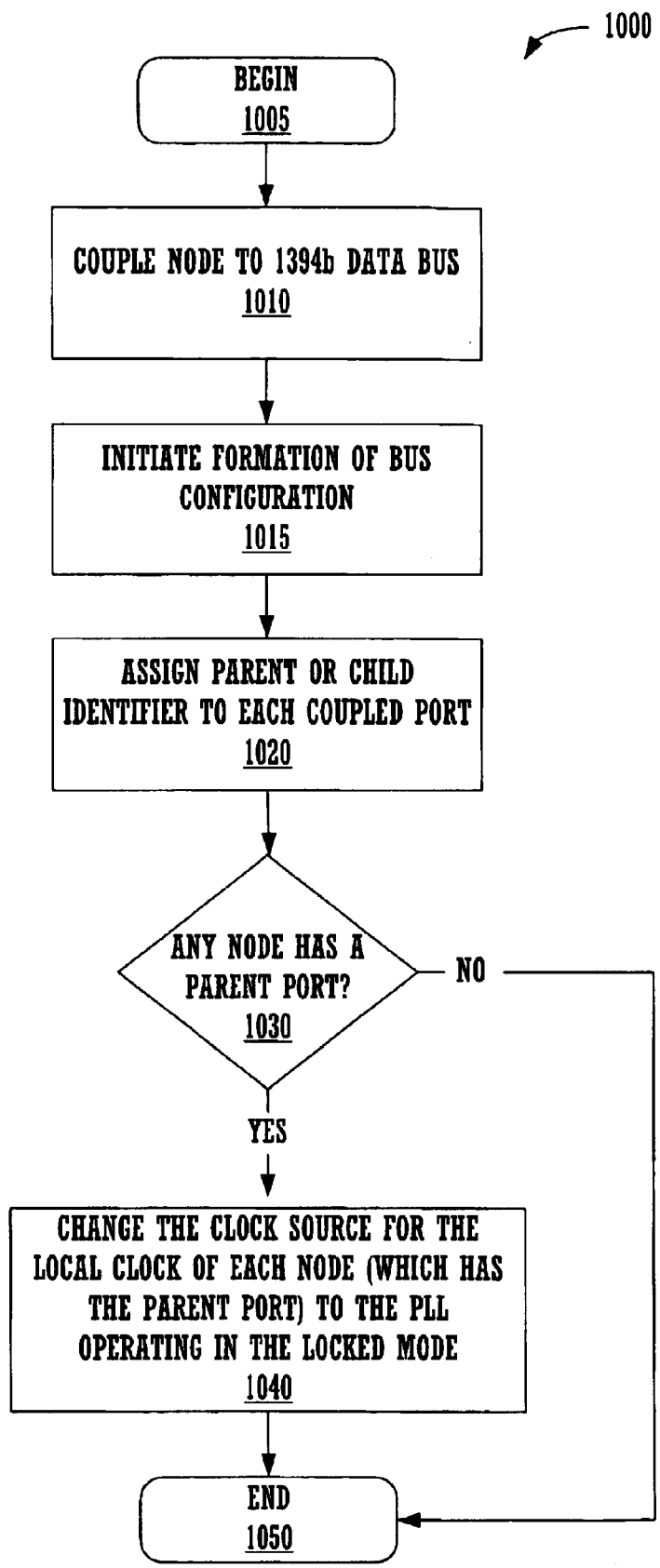
FIG. 13B illustrates a flow diagram, showing a method of synchronizing local clocks in a data bus system in accordance with a second embodiment of the present invention.

FIG. 13B illustrates a flow diagram 1000, showing a method of synchronizing local clocks in a data bus system 600 (FIG. 13) in accordance with a second embodiment of the present invention. In a second embodiment, the data bus system is a 1394b data bus system having a plurality of nodes (each node compliant with the 1394b specification). Each node is a device (e.g., computer system, digital camera, digital VCR, TV settop box, digital camcorder, storage device, digital audio device, etc.) which is compliant with the 1394b specification.

At step 1005, the method of synchronizing local clocks in a data bus system 600 in accordance with an embodiment begins.

At step 1010, a node (e.g., node 900A of FIG. 9B) is coupled to the 1394b data bus system 600.

At step 1015, formation of a data bus configuration for the 1394b data bus system 600 is initiated. It should be understood that formation of the data bus configuration can be initiated by the occurrence of any event or condition specified in the 1394b specification. Additionally, one of the nodes is designated as the root node. Initially, the local clocks are provided by the respective multiple mode clock recovery circuit operating in the unlock mode.

At step 1020, each node assigns a parent port identifier or a child port identifier to each port that is coupled to another port.

At step 1030, it is determined whether any node has a port that is assigned the parent port identifier. At step 1050, the method according to a second embodiment of the present invention ends if a port has not been assigned the parent port identifier.

Otherwise, at step 1040, each node (having a port that is assigned the parent port identifier) changes the clock source for its local clock from the multiple mode clock recovery circuit operating in the unlocked mode to the multiple mode clock recovery circuit operating in the locked mode. The multiple mode clock recovery circuit operating in the locked mode recovers the local clock transmitted by a transmitting node coupled to the port that is assigned the parent port identifier. In a second embodiment, the multiple mode clock recovery circuit comprises a phase locked loop (PLL). In a second embodiment, each node includes a mode selection circuit for facilitating changing the clock source for the local clock.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of synchronizing a plurality of local clocks in a data bus system having a plurality of nodes, each node having one of said plurality of local clocks, said method comprising the steps of:
    a) initiating formation of a data bus configuration for said data bus system, wherein each node includes a local clock generator, at least one port, and at least one clock recovery circuit coupled to a respective port, wherein a coupled port represents a port coupled to another port;
    b) for each node, assigning each coupled port one of a plurality of identifiers based on predetermined criteria said identifiers including a first identifier and a second identifier; and
    c) for each node which has a first identifier port, changing a clock source for a respective local clock of said node from a respective local clock generator of said node to a particular clock recovery circuit of said node, wherein said particular clock recovery circuit recovers a transmitted local clock of a transmitting node coupled to said first identifier port via a second identifier port.

2. A method as recited in claim 1 wherein said data bus system comprises a 1394b data bus system.

3. A method as recited in claim 2 wherein said step a) is performed during a bus reset procedure.

4. A method as recited in claim 2 wherein said step b) is performed during a tree identification procedure.

5. A method as recited in claim 2 wherein said step c) is performed during a self identification procedure.

6. A method as recited in claim 2 wherein said data bus system includes a physical layer, and wherein said physical layer includes said plurality of local clocks.

7. A method as recited in claim 1 wherein said first identifier is a parent port, and wherein said second identifier is a child port.

8. A method as recited in claim 1 wherein said transmitting node encodes said transmitted local clock and data using an 8B10B coding before transmitting said transmitted local clock and said data.

9. A method as recited in claim 1 wherein said plurality of nodes includes a root node, wherein said local clock of said root node is generated by a local clock generator of said root node, and wherein said root node is coupled to said first identifier port of at least one node.

10. A method as recited in claim 1 wherein each clock recovery circuit comprises a phase locked loop.

11. A method of synchronizing a plurality of local clocks in a data bus system having a plurality of nodes, each node having one of said plurality of local clocks, said method comprising the steps of:
    a) initiating formation of a data bus configuration for said data bus system, wherein each node includes at least one port and a multiple mode clock recovery circuit (MMCRC), wherein said MMCRC operates in each of a plurality of modes said modes including a locked mode and an unlocked mode, wherein a coupled port represents a port coupled to another port;
    b) for each node, assigning each coupled port one of a plurality of identifiers based on predetermined criteria said identifiers including a first identifier and a second identifier; and
    c) for each node which has a first identifier port, changing a clock source for a respective local clock of said node from said MMCRC operating in said unlocked mode to said MMCRC operating in said locked mode, wherein said MMCRC operating in said locked mode recovers a transmitted local clock of a transmitting node coupled to said first identifier port via a second identifier port.

12. A method as recited in claim 11 wherein said data bus system comprises a 1394b data bus system.

13. A method as recited in claim 12 wherein said step a) is performed during a bus reset procedure.

14. A method as recited in claim 12 wherein said step b) is performed during a tree identification procedure.

15. A method as recited in claim 12 wherein said step c) is performed during a self identification procedure.

16. A method as recited in claim 12 wherein said data bus system includes a physical layer, and wherein said physical layer includes said plurality of local clocks.

17. A method as recited in claim 11 wherein said first identifier is a parent port, and wherein said second identifier is a child port.

18. A method as recited in claim 11 wherein said transmitting node encodes said transmitted local clock and data using an 8B10B coding before transmitting said transmitted local clock and said data.

19. A method as recited in claim 11 wherein said plurality of nodes includes a root node, wherein said local clock of said root node is generated by said MMCRC operating in said unlocked mode, and wherein said root node is coupled to said first identifier port of at least one node.

20. A method as recited in claim 11 wherein said MMCRC comprises a phase locked loop.

21. A method as recited in claim 20 wherein said phase locked loop includes a voltage controlled crystal oscillator for generating a signal representing said clock source for said local clock when said MMCRC operates in said unlocked mode.

22. A method as recited in claim 11 wherein each node has a switch for operating said MMCRC in a particular mode, and wherein said step c) includes the step of activating said switch to cause said MMCRC to operate in said locked mode.

23. A data bus system comprising:
   a plurality of nodes, each node having:
      a respective local clock;
      a local clock generator operable to generate said respective local clock;
      at least one port; and
      at least one clock recovery circuit operable to generate said respective local clock and coupled to a respective port;
   wherein each node assigns each port coupled to another port one of a plurality of identifiers based on predetermined criteria said identifiers including a first identifier and a second identifier, wherein a clock source for said respective local clock of each node which has a first identifier port is a particular clock recovery circuit of said node instead of said local clock generator of said node, and wherein said particular clock recovery circuit recovers a transmitted local clock of a transmitting node coupled to said first identifier port via a second identifier port.

24. A data bus system as recited in claim 23 wherein said plurality of nodes includes a root node, wherein said respective local clock of said root node is generated by said local clock generator of said root node, and wherein said root node is coupled to said first identifier port of at least one node.

25. A data bus system as recited in claim 23 wherein said respective local clock generator comprises a crystal oscillator.

26. A data bus system as recited in claim 23 wherein each clock recovery circuit comprises a phase locked loop.

27. A data bus system as recited in claim 23 wherein each node further includes a switch coupled to said local clock generator and coupled to each clock recovery circuit, wherein said switch facilitates changing said clock source for said respective local clock of said node from said local clock generator to said particular clock recovery circuit.

28. A data bus system as recited in claim 23 wherein said data bus system comprises a 1394*b* data bus system.

29. A data bus system as recited in claim 28 wherein said data bus system includes a physical layer, and wherein said physical layer includes each respective local clock.

30. A data bus system as recited in claim 23 wherein said first identifier is a parent port, and wherein said second identifier is a child port.

31. A data bus system as recited in claim 23 wherein said transmitting node encodes said transmitted local clock and data using an 8B10B coding before transmitting said transmitted local clock and said data.

32. A data bus system comprising:
   a plurality of nodes, each node having:
      a respective local clock;
      at least one port; and
      a multiple mode clock recovery circuit (MMCRC) operable to generate said respective local clock, wherein said MMCRC operates in each of a plurality of modes said modes including a locked mode and an unlocked mode; and
   wherein each node assigns each port coupled to another port one of a plurality of identifiers based on predetermined criteria said identifiers including a first identifier and a second identifier, wherein a clock source for said respective local clock of each node which has a first identifier port is said MMCRC operating in said locked mode of said node instead of said MMCRC operating in said unlocked mode, and wherein said MMCRC operating in said locked mode recovers a transmitted local clock of a transmitting node coupled to said first identifier port via a second identifier port.

33. A data bus system as recited in claim 32 wherein said plurality of nodes includes a root node, wherein said respective local clock of said root node is generated by said MMCRC operating in said unlocked mode, and wherein said root node is coupled to said first identifier port of at least one node.

34. A data bus system as recited in claim 32 wherein said MMCRC comprises a phase locked loop.

35. A data bus system as recited in claim 34 wherein said phase locked loop includes a voltage controlled crystal oscillator for generating a signal representing said clock source for said respective local clock when said MMCRC operates in said unlocked mode.

36. A data bus system as recited in claim 32 wherein each node includes a switch for operating said MMCRC in a particular mode, wherein said switch facilitates changing said clock source for said respective local clock from said MMCRC operating in said unlocked mode to said MMCRC operating in said locked mode.

37. A data bus system as recited in claim 32 wherein said data bus system comprises a 1394b data bus system.

38. A data bus system as recited in claim 37 wherein said data bus system includes a physical layer, and wherein said physical layer includes each respective local clock.

39. A data bus system as recited in claim 32 wherein said first identifier is a parent port, and wherein said second identifier is a child port.

40. A data bus system as recited in claim 32 wherein said transmitting node encodes said transmitted local clock and data using an 8B10B coding before transmitting said transmitted local clock and said data.

41. A data bus node comprising:
   a local clock;
   a local clock generator operable to generate said local clock;
   at least one port; and
   at least one clock recovery circuit operable to generate said local clock and coupled to a respective port;
   wherein said data bus node assigns each port coupled to another data bus node one of a plurality of identifiers based on predetermined criteria said identifiers including a first identifier and a second identifier, wherein if said data bus node has a first identifier port, a clock source for said local clock is a particular clock recovery circuit instead of said local clock generator, and wherein said particular clock recovery circuit recovers a transmitted local clock of a transmitting data bus node coupled to said first identifier port.

42. A data bus node as recited in claim 41 wherein said local clock generator comprises a crystal oscillator.

43. A data bus node as recited in claim 41 wherein each clock recovery circuit comprises a phase locked loop.

44. A data bus node as recited in claim 41 further including a switch coupled to said local clock generator and coupled to each clock recovery circuit, wherein said switch facilitates changing said clock source for said local clock from said local clock generator to said particular clock recovery circuit.

45. A data bus node as recited in claim 41 wherein said data bus node is a 1394b data bus node, wherein said first identifier is a parent port, and wherein said second identifier is a child port.

46. A data bus node comprising:

a local clock;

at least one port; and a multiple mode clock recovery circuit (MMCRC) operable to generate said local clock, wherein said MMCRC operates in each of a plurality of modes said modes including a locked mode and an unlocked mode; and wherein said data bus node assigns each port coupled to another data bus node one of a plurality of identifiers based on predetermined criteria said identifiers including a first identifier and a second identifier, wherein if said data bus node has a first identifier port, a clock source for said local clock is said MMCRC operating in said locked mode instead of said MMCRC operating in said unlocked mode, and wherein said MMCRC operating in said locked mode recovers a transmitted local clock of a transmitting data bus node coupled to said first identifier port.

47. A data bus node as recited in claim 46 wherein said MMCRC comprises a phase locked loop.

48. A data bus node as recited in claim 47 wherein said phase locked loop includes a voltage controlled crystal oscillator for generating a signal representing said clock source for said local clock when said MMCRC operates in said unlocked mode.

49. A data bus node as recited in claim 46 further including a switch for operating said MMCRC in a particular mode, wherein said switch facilitates changing said clock source for said local clock from said MMCRC operating in said unlocked mode to said MMCRC operating in said locked mode.

50. A data bus node as recited in claim 46 wherein said data bus node comprises a 1394b data bus node, wherein said first identifier is a parent port, and wherein said second identifier is a child port.

* * * * *